United States Patent
Lee et al.

(10) Patent No.: US 11,176,381 B2
(45) Date of Patent: Nov. 16, 2021

(54) VIDEO OBJECT SEGMENTATION BY REFERENCE-GUIDED MASK PROPAGATION

(71) Applicant: Adobe Inc., San Jose, CA (US)

(72) Inventors: Joon-Young Lee, Milpitas, CA (US); Seoungwug Oh, Seoul (KR); Kalyan Krishna Sunkavalli, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1 day.

(21) Appl. No.: 16/856,292

(22) Filed: Apr. 23, 2020

(65) Prior Publication Data

US 2020/0250436 A1  Aug. 6, 2020

Related U.S. Application Data

(63) Continuation of application No. 15/949,935, filed on Apr. 10, 2018, now Pat. No. 10,671,855.

(51) Int. Cl.
*G06K 9/00* (2006.01)
*G06T 7/155* (2017.01)
(Continued)

(52) U.S. Cl.
CPC ......... *G06K 9/00765* (2013.01); *G06K 9/627* (2013.01); *G06K 9/6256* (2013.01); *G06T 7/155* (2017.01); *G06T 9/002* (2013.01); *G06K 2209/21* (2013.01); *G06T 2207/20081* (2013.01); *G06T 2207/20084* (2013.01)

(58) Field of Classification Search
CPC ............ G06K 9/00765; G06K 9/3233; G06K 9/6256; G06K 9/627; G06K 2209/21; G06T 7/155; G06T 9/002; G06T 2207/20084; G06T 2207/20081
See application file for complete search history.

(56) References Cited

U.S. PATENT DOCUMENTS 8,837,839 B1 * 9/2014 Huber .................. G06K 9/4671
382/224
2012/0099771 A1 4/2012 Lao
(Continued)

OTHER PUBLICATIONS

Ramakanth, S. Avinash, et el., "Seamseg: Video Object Segmentation Using Patch Seams", In Proceedings of the IEEE Conference on Computer Vision and Pattern Recognition, Jun. 2014, 8 pages.
(Continued)

*Primary Examiner* — Carol Wang
(74) *Attorney, Agent, or Firm* — Kilpatrick Townsend & Stockton LLP

(57) ABSTRACT

Various embodiments describe video object segmentation using a neural network and the training of the neural network. The neural network both detects a target object in the current frame based on a reference frame and a reference mask that define the target object and propagates the segmentation mask of the target object for a previous frame to the current frame to generate a segmentation mask for the current frame. In some embodiments, the neural network is pre-trained using synthetically generated static training images and is then fine-tuned using training videos.

20 Claims, 19 Drawing Sheets
(13 of 19 Drawing Sheet(s) Filed in Color)

(51) Int. Cl.
  G06K 9/62  (2006.01)
  G06T 9/00  (2006.01)

(56) References Cited

U.S. PATENT DOCUMENTS

| | | | |
|---|---|---|---|
| 2018/0089834 | A1 | 3/2018 | Spizhevoy |
| 2018/0260668 | A1* | 9/2018 | Shen ................. G06T 11/00 |
| 2019/0057507 | A1 | 2/2019 | El-Khamy |
| 2019/0073563 | A1 | 3/2019 | Chapapos |
| 2019/0114774 | A1 | 4/2019 | Zhang |
| 2019/0164290 | A1 | 5/2019 | Wang |
| 2019/0172223 | A1 | 6/2019 | Vajda |

OTHER PUBLICATIONS

Bai, Xue, et al., "Video Snapcut: Robust Video Object Cutout Using Localized Classifiers", In ACM Transactions on Graphics (ToG), vol. 28, 2009, 11 pages.

Ballas, Nicolas, et al., "Delving Deeper Into Convolutional Networks For Learning Video Representations", arXiv preprint arXiv:1511.06432, Nov. 2015, preprint, Mar. 2016, 11 pages.

Brox, Thomas, et al., "Object Segmentation By Long Term Analysis of Point Trajectories", In European Conference on Computer Vision, Springer, 2010, 14 pages.

Caelles, S., et al., "One-shot Video Object Segmentation", In Proceedings of the IEEE Conference on Computer Vision and Pattern Recognition, IEEE, 2017, 10 pages.

Chen, Liang-Chieh, et al., "Deeplab: Semantic Image Segmentation With Deep Convolutional Nets, Atrous Convolution, And Fully Connected CRFS", arXiv preprint arXiv:1606.00915, Jun. 2016, preprint May 2017, 14 pages.

Cheng, Jingchun, et al, "Segflow: Joint Learning For Video Object Segmentation And Optical Flow", Proceedings of the IEEE International Conference on Computer Vision, Sep. 2017, 10 pages.

Cheng, Ming-Ming, et al., "Global Contrast Based Salient Region Detection", IEEE Transactions on Pattern Analysis and Machine Intelligence, 37(3), Mar. 2015, 9 pages.

Cho, Kyunghyun, et al., "Learning Phrase Representations Using RNN Encoder-Decoder For Statistical Machine Translation", arXiv preprint arXiv:1406.1078, Jun. 2014, revised Sep. 2014, 15 pages.

Everingham, Mark, et al., "The Pascal Visual Object Classes (VOC) Challenge", International Journal of Computer Vision, 88(2), 2010, 34 pages.

Fan, Qingnan, et al., "JumpCut: Non-Successive Mask Transfer And Interpolation For Video Cutout", ACM Transactions on Graphics (TOG), 34(6), 2015, 10 pages.

Girshick, Ross, "Fast R-CNN", In Proceedings of the IEEE International Conference on Computer Vision, Sep. 2015, 9 pages.

Grundmann, Mathias, et al., "Efficient Hierarchical Graph-Based Video Segmentation", In Proceedings of the IEEE Conference on Computer Vision and Pattern Recognition, IEEE, Jun. 2010, 8 pages.

Hariharan, Bharath, et al., "Semantic Contours From Inverse Detectors", In Proceedings of the IEEE International Conference on Computer Vision, IEEE, 2011, 8 pages.

He, Kaiming, et al., "Mask R-CNN", In Proceedings of the IEEE International Conference on Computer Vision, Mar. 2017, revised Jan. 2018, 12 pages.

He, Kaiming, et al., "Deep Residual Learning For Image Recognition", In Proceedings of the IEEE Conference on Computer Vision and Pattern Recognition, 2016, 9 pages.

He, Kaiming, et al., "Identity Mappings In Deep Residual Networks", In European Conference on Computer Vision, Springer, arXiv:1603.05057v3, Jul. 2016, 15 pages.

Hu, Yuan-Ting, et al., "MaskRNN: Instance Level Video Object Segmentation", In Advances in Neural Information Processing Systems, 2017, 10 pages.

Ioffe, Sergey, et al., "Batch Normalization: Accelerating Deep Network Training By Reducing Internal Covariate Shift", In International Conference on Machine Learning, arXiv:1502.03167v3, Mar. 2015, 11 pages.

Jampani, Varun, et al., "Video Propagation Networks", Proceedings of the IEEE Conference on Computer Vision and Pattern Recognition, 2017, 11 pages.

Khoreva, Anna, et al., "Lucid Data Dreaming For Object Tracking", arXiv preprint arXiv:1703.09554, Dec. 2017, 16 pages.

Kingma, Diederik P., et al., "Adam: A Method For Stochastic Optimization", In International Conference on Learning Representations, 2015, reprint arXiv:1412.6980v9, Jan. 2017, 15 pages.

Krahenbuhl, Philipp, et al., "Efficient Inference In Fully Connected CRFs With Gaussian Edge Potentials", In Advances in Neural Information Processing Systems, 2011, 9 pages.

Li, Fuxin, et al., "Video Segmentation By Tracking Many Figure-Ground Segments", In Proceedings of the IEEE International Conference on Computer Vision, 2013, 8 pages.

Li, Wenbin, et al., "Roto++: Accelerating Professional Rotoscoping Using Shape Manifolds", ACM Transactions on Graphics (TOG), 35(4), 2016, 15 pages.

Li, Yi, et al., "Fully Convolutional Instance-Aware Semantic Segmentation", Proceedings of the IEEE Conference on Computer Vision and Pattern Recognition, 2017, 9 pages.

Maninis, K.-K, et al., "Video Object Segmentation Without Temporal Information", arXiv preprint arXiv:1709.06031, Sep. 2017, 14 pages.

Marki, Nicolas, et al., "Bilateral Space Video Segmentation" In Proceedings of the IEEE Conference on Computer Vision and Pattern Recognition, 2016, 9 pages.

Peng, Chao, et al., "Large Kernel Matters-Improve Semantic Segmentation By Global Convolutional Network", arXiv preprint arXiv:1703.02719, Mar. 2017, 11 pages.

Perazzi, Federico, et al., "Learning Video Object Segmentation From Static Images", In Proceedings of the IEEE Conference on Computer Vision and Pattern Recognition, 2016, 10 pages.

Perazzi, Federico, et al., "A Benchmark Dataset And Evaluation Methodology For Video Object Segmentation", In Proceedings of the IEEE Conference on Computer Vision and Pattern Recognition, Jun. 2016, 9 pages.

Pinheiro, Pedro O., et al., "Learning To Refine Object Segments", In European Conference on Computer Vision, Springer, 2016, reprint arXiv:1603.08695v2, 18 pages.

Pont-Tuset, Jordi, et al., "The 2017 Davis Challenge On Video Object Segmentation", arXiv:1704.00675, 2017, reprint arXiv:1704.00675v3, Mar. 2018, 6 pages.

Shi, Jianping, et al., "Hierarchical Image Saliency Detection On Extended CSSD", IEEE Transactions on Pattern Analysis and Machine Intelligence, 38(4), Apr. 2016, 14 pages.

Tokmakov, Pavel, et al., "Learning Motion Patterns In Videos", arXiv preprint arXiv:1612.07217, Dec. 2016, reprint, arXiv:1612.07217v2, Apr. 2017, 9 pages.

Tokmakov, Pavel, et al., "Learning Video Object Segmentation With Visual Memory", In Proceedings of the IEEE International Conference on Computer Vision, 2017, 10 pages.

Tsai, David, et al., "Motion Coherent Tracking Using Multi-Label MRF Optimization", International Journal of Computer Vision, 100(2), 2012, 11 pages.

Tsai, Yi-Hsuan, et al., "Video Segmentation Via Object Flow", In Proceedings of the IEEE Conference on Computer Vision and Pattern Recognition, 2016, 10 pages.

Voigtlaender, Paul, et al., "Online Adaptation Of Convolutional Neural Networks For The 2017 Davis Challenge On Video Object Segmentation", The 2017 DAVIS Challenge on Video Object Segmentation—CVPR Workshops, 2017, 6 pages.

Voigtlaender, Paul, et al , "Online Adaptation Of Convolutional Neural Networks For Video Object Segmentation", In British Machine Vision Conference, 2017, arXiv:1706.09364v2, 2017, 16 pages.

Wang, Jue, et al., "Interactive Video Cutout", In ACM Transactions on Graphics (ToG), vol. 24, ACM, 2005, 10 pages.

Wang, Wenguan, et al., "Saliency-Aware Geodesic Video Object Segmentation", In Proceedings of the IEEE Conference on Computer Vision and Pattern Recognition, 2015, 8 pages.

(56) References Cited

OTHER PUBLICATIONS

Werbos, P.J., "Backpropagation Through Time: What It Does And How To Do It", Proceedings of the IEEE, 78(10), 1990, 11 pages.

Yang, Jimei, et al., Weakly-Supervised Disentangling With Recurrent Transformations For 3D View Synthesis, In Advances in Neural Information Processing Systems, 2015, 9 pages.

Yoon, Jae Shin, et al., "Pixel-Level Matching For Video Object Segmentation Using Convolutional Neural Networks", In Proceedings of the IEEE International Conference on Computer Vision, 2017, 10 pages.

Zhong, Fan, et al., "Discontinuity-Aware Video Object Cutout", ACM Transactions on Graphics (TOG), 31(6), Nov. 2012, 10 pages.

Jang, Won-Dong, et al., "Online Video Object Segmentation Via Convolutional Trident Network", In Proceedings of the IEEE Conference on Computer vision and Pattern Recognition, 2017, 10 pages.

Notice of Allowance from related U.S. Appl. No. 15/949,935 dated Jan. 21, 2020, 17 pages.

\* cited by examiner

VIDEO OBJECT SEGMENTATION BY REFERENCE-GUIDED MASK PROPAGATION

CROSS-REFERENCE TO RELATED APPLICATIONS

This application is a continuation application of application Ser. No. 15/949,935, filed Apr. 10, 2018, now allowed, which is incorporated herein by reference in its entirety.

TECHNICAL FIELD

This application relates generally to segmenting video objects from a video stream using an artificial neural network.

BACKGROUND

Image segmentation can be used to, for example, determine related areas of an image, such as related areas that form a figure of an object. Video object segmentation, on the other hand, is generally performed to separate one or more foreground objects from the background and output one or more masks of the one or more foreground objects in each frame of a video stream for applications, such as video analysis and editing, or video compression. Video object segmentation is generally more difficult than image segmentation due to, for example, the motions of the target objects. Some real-life video scenarios, such as deforming shapes, fast movements, and multiple objects occluding each other, pose significant challenges to video object segmentation. While recent work has tried to address these challenges, performance is still limited in terms of both the quality and the speed. For example, post-production video editing often requires a significant amount of manual interaction to achieve satisfactory results.

To temporally and spatially smooth estimated object mask, graphical model based techniques have been proposed. While graphical models enable an effective mask propagation across an entire video stream, they are often sensitive to certain parameters of the graphical models. Recently, deep learning-based techniques have been applied to video object segmentation. The deep learning-based techniques generally predict the segmentation mask frame-by-frame, or incorporate additional cues from a preceding frame using, for example, optical flow, semantic segmentations, or mask propagation. Most deep learning-based video object segmentation techniques are based on semi-supervised learning, where the ground-truth segmentation mask of a reference frame (e.g., the first frame) is used to segment a target object in every consecutive frames. Two example deep learning-based video object segmentation techniques are one shot video object segmentation (OSVOS) and MaskTrack techniques. Most existing deep learning-based techniques are built on one of these two techniques. The OSVOS technique is generally based on the appearance of the target object in an annotated frame, and often fails to adapt to appearance changes and has difficulty separating multiple objects with similar appearances. The MaskTrack technique may be vulnerable to temporal discontinuities like occlusions and rapid motion, and can suffer from drifting once the propagation becomes unreliable. As a result, some post-processing may be required in order to achieve a desired result.

In addition, most of these approaches rely heavily on online training, where a pre-trained deep network is fine-tuned on the test video. While online training improves segmentation accuracy by letting the network adapt to the target object appearance, it is computationally expensive and time consuming (e.g. it may require several minutes of GPU-powered training for each test video), thus limiting its practical use.

Furthermore, the available annotated video datasets for training a deep neural network for video object segmentation are very limited. Thus, it is challenging to train the deep neural network with the limited available training samples.

SUMMARY

Embodiments of the present disclosure are directed to, among other things, segmenting video objects from a video stream using an artificial neural network. In one embodiment, a method of a semi-supervised video object segmentation is disclosed. A encoder-decoder network (e.g., Siamese network) simultaneously propagates the segmentation mask for a previous frame to the current frame and detects the target object specified in a reference frame in the current frame. A sharp object mask can thus be generated without the time-consuming post-processing. According to some embodiments, a two-stage training process is used to first pre-train the network using synthetically generated training images and then fine-tune the network using training videos. In this way, the network can be trained using limited segmented training videos.

The fine-tuned network can be used to segment any video stream with a reference frame (e.g., the first frame of the video stream) and a corresponding ground-truth segmentation mask without online training. As a result, the video stream can be segmented at a higher speed and/or using less complex hardware.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 1A illustrates an example video stream for video object segmentation. FIG. 1B illustrates an example set of segmentation masks.

DETAILED DESCRIPTION

Figure 1A:
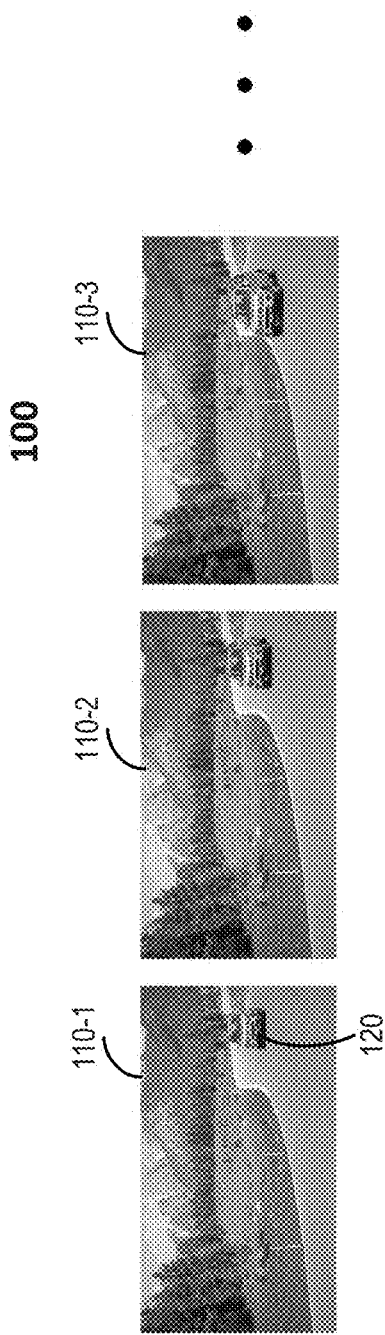
FIGS. 1A and 1B illustrate an example process of video object segmentation.

Techniques disclosed herein relate generally to video object segmentation using a neural network. In one example, a neural network including two encoders (e.g., a Siamese decoder network include two identical encoders) is used to not only detect a target object in a video stream by matching the appearance of the target object in a reference frame, but also track the segmentation mask by referencing the segmentation mask for a previous frame in the current frame. One of the two encoders extracts features from a target video frame and a previous segmentation mask, while the other encoder extracts features from the reference video frame (e.g., the first video frame of a video stream) and the ground-truth segmentation mask identifying a target object. The extracted features are then combined and used to extract the segmentation mask for the target frame. In some embodiments, the neural network is trained using a two-stage training process. The two-stage training process first pre-trains the neural network using synthetically generated training images and then fine-tunes the neural network using training videos, such that the network can be trained using limited segmented training videos.

The neural network architecture and training scheme take advantages of both the propagation and detection cues. As such, the neural network works robustly without any online training or post-processing, leading to high accuracy, high efficiency, and low hardware resource requirement at test (i.e., inference) time. The techniques disclosed herein not only achieve state-of-the-art performance on public benchmark datasets, but also run orders of magnitude faster than techniques that rely on online training. For example, as shown in the evaluation results below, among the methods without online training, the techniques disclosed herein outperform other methods by about 10 to 20% in accuracy. Compared with methods with online training, the techniques disclosed herein can achieve a comparable accuracy (e.g., over 80%) at a much faster speed (e.g., about 0.13 versus about 4.5 or more seconds per frame) without the online fine-tuning and post-processing.

As used herein, the term "image" refers to a graphical digital image depicting a graphical representation of subject matter. In some examples, an image uses pixels or vector-based graphics to represent a depiction of an object, such as a person, an animal, a vehicle, a scene, etc. In some cases, an image is a stand-alone image, such as a photograph, drawing, or scanned document. Additionally or alternatively, an image is included in a collection of images, such as a frame within a video stream that includes a set of video frames.

As used herein, the term "feature" refers to a graphical quality of an image. An image can include low-level features describing fundamental qualities of the image, such as brightness, contrast, color, directional edges (e.g., vertical, horizontal, diagonal edges), textures depicted in the image, image resolution, or other low-level features. In some cases, a low-level feature is determined at a pixel level, or close to a pixel level. Additionally or alternatively, the image can include high-level features describing contextual qualities representing graphical content of the image, such as semantic features. A semantic feature can describe the meaningful content of an image, such as image content representing a human figure, an object held by the human figure, an action occurring in the image, an emotion apparent in the image, background objects or figures, or other types of image content. In some cases, a high-level feature is determined based on the semantic content of the image, including, for example, content areas in the image (e.g., figures, objects), spatial relationships between areas of content (e.g., foreground, background), and categories of content (e.g., scenes, objects, actions). In some cases, features include portions of the image, such as groups of pixels. Additionally or alternatively, features include graphical representations of the image, such as graphical representations of vertical edges in the image, or rounded edges in the image. Additionally or alternatively, features include transformations of the image, such as a blue-filtered transformation of the image (e.g., from a red-green-blue image format). In some cases, "features" refers also or alternatively to non-graphical representations of graphical qualities, such as a mathematical gradient based on lighting depicted in the image, or a data structure including an indication of whether the image includes a type of semantic content, such as a human figure.

As used herein, the term "segmentation" refers to analysis of an image to determine related areas of the image. In some cases, segmentation is based on semantic content of the image. In one example, segmentation analysis performed on an image indicates a region of the image depicting a human figure. In some cases, segmentation analysis produces segmentation data, such as a segmentation mask identifying the area of an image corresponding to a target object. The segmentation data indicates one or more segmented regions of the analyzed image. For example, segmentation data includes a set of labels, such as pairwise labels (e.g., labels having a value indicating "yes" or "no") indicating whether a given pixel in the image is part of an image region depicting a human figure. In some cases, labels have multiple available values, such as a set of labels indicating whether a given pixel depicts, for example, a human figure, an animal figure, or a background region. Additionally or alternatively, the segmentation data includes numerical data, such as data indicating a probability that a given pixel is an image region depicting a human figure. In some cases, segmentation data includes additional types of data, such as text, database records, or additional data types or structures.

As used herein, the term "mask" refers to a region of interest (e.g., a visible region of an object in an image) represented by non-zero pixel values in an image. A mask, objet mask, or segmentation mask may refer to an image where the intensity values for pixels in a region of interest are non-zero, while the intensity values for pixels in other regions of the image are set to the background value (e.g., zero).

As used herein, a "target object" or "object" refers to, for example, one or more human figures, nonhuman subjects (e.g., animals), mechanical subjects (e.g., vehicles, robots), environmental subjects (e.g., buildings, plants), or artistic subjects (e.g., cartoon characters, paintings, computer-generated characters), and images of such subjects. In some cases, an image only include a portion of a target object, such as a face of a person, rather than the whole object.

As used herein, the term "neural network" refers to one or more computer-implemented networks capable of being trained to achieve a goal. Unless otherwise indicated, references herein to a neural network include one neural network or multiple interrelated neural networks that are trained together. In some cases, a neural network (or a component of a neural network) produces output data, such as segmentation data, data indicating image features, or other suitable types of data. Examples of neural networks include, without limitation, convolutional neural networks (CNNs), recurrent neural networks (RNNs), fully-connected neural networks, encoder neural networks (e.g., "encoders"), decoder neural networks (e.g., "decoders"), dense-connection neural networks, and other types of neural networks. In some embodiments, a neural network can be implemented using special hardware (e.g., GPU, tensor processing units (TPUs), or processing element arrays (PE arrays)), using software code and a general purpose processor, or a combination of special hardware and software code.

As used herein, the term "layer" or "network layer" refers to an analysis stage in a neural network. Layers perform different types of analysis related to the type of neural network. For example, layers in an encoder perform different types of analysis on an input image. In some cases, a particular encoder layer provides features based on the particular analysis performed by that layer. In some cases, a particular encoder layer down-samples a received image. An additional encoder layer performs additional down-sampling. In some cases, each round of down-sampling reduces the visual quality of the output image, but provides features based on the related analysis performed by that encoder layer.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Video object segmentation can be used to segment an object from a background and output a mask of the object in each frame of a video stream that includes a set of video frames, where the mask may be used for applications, such as video analysis, editing, or compression. In general, the object to be segmented is annotated (e.g., using a ground-truth mask) in the first frame of the video stream. The object in other frames of the video stream is then segmented based on the segmentation in the first frame.

Figure 1B:
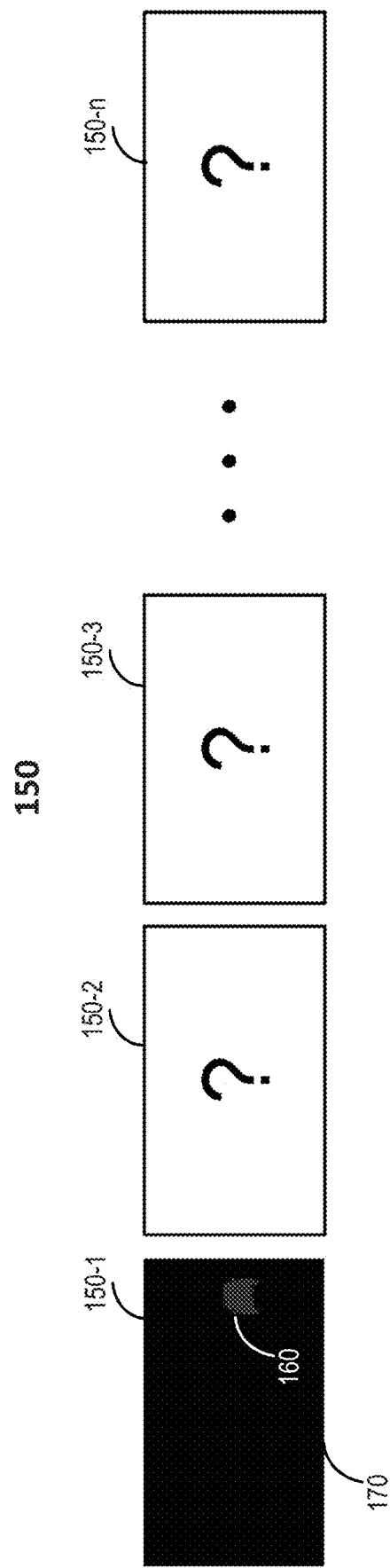

FIGS. 1A and 1B illustrate an example process of video object segmentation. FIG. 1A illustrates an example video stream 100 for video object segmentation. Example video stream 100 includes a set of n video frames 110-1, 110-2, 110-3, . . . , and 110-n (collectively video frames 110) that are sequential in time. For example, the set of video frames can be captured at a certain frame rate, such as, for example, 25 or 30 frames per second. Each video frame 110 includes a foreground object 120 (e.g., a car) to be segmented from the background in each video frame 110. As shown in FIG. 1A, foreground object 120 can be of different sizes and/or orientations at different locations in different video frames 110.

FIG. 1B illustrates an example set of segmentation masks 150 for video stream 100. The set of segmentation masks 150 includes n segmentation masks 150-1, 150-2, 150-3, . . . , and 150-n, where each segmentation mask 150 corresponds to a video frame 110. In general, the first segmentation mask 150-1 for the first video frame 110-1 is given or otherwise annotated before segmenting video stream 100, such that it is known which target object is to be segmented in the video frames. As shown in FIG. 1B, segmentation mask 150-1 includes a background 170 that is represented by pixels having intensity values of zero (black pixels) and a mask 160 represented by pixels having non-zero intensity values. The location and dimensions of mask 160 in segmentation mask 150-1 correspond to the location and dimensions of foreground object 120 in video frame 110-1. The objective of video object segmentation is to generate segmentation masks 150-2, 150-3, . . . , and 150-n that indicate the locations of the dimensions of foreground object 120 in video frames 110-2, 110-3, . . . , and 110-n, based on video frame 110-1 and segmentation mask 150-1.

As described above, recent techniques for video object segmentation have utilized deep neural networks and machine learning. Deep learning-based techniques generally predict the segmentation mask frame-by-frame or incorporate additional cues from the preceding frame using, for example, optical flow, semantic segmentations, or mask propagation. Unsupervised learning methods aim to segment a foreground object in a fully automatic way without any user annotation. The main sources of information include visual saliency and difference in motion (e.g. optical flow and long-term trajectory). However, the criteria for a foreground object are often ambiguous and thus the unsupervised segmentation does not fit well with the interactive video editing scenario. Therefore, most deep learning-based video object segmentation techniques are based on semi-supervised learning, where the ground-truth segmentation mask of the first frame of a video stream (i.e., a video clip) is used to segment the annotated object in each of a set of consecutive frames. A deep neural network can be trained using a set of training videos through the semi-supervised machine learning on, for example, a computer, a server, or a cloud-based computing system. The trained neural network can then be used by end users to segment video object in a target video stream. The video object segmentation for the target video stream can be performed on an end user device, a computer, a server, or a cloud-based computing system.

Figure 2:
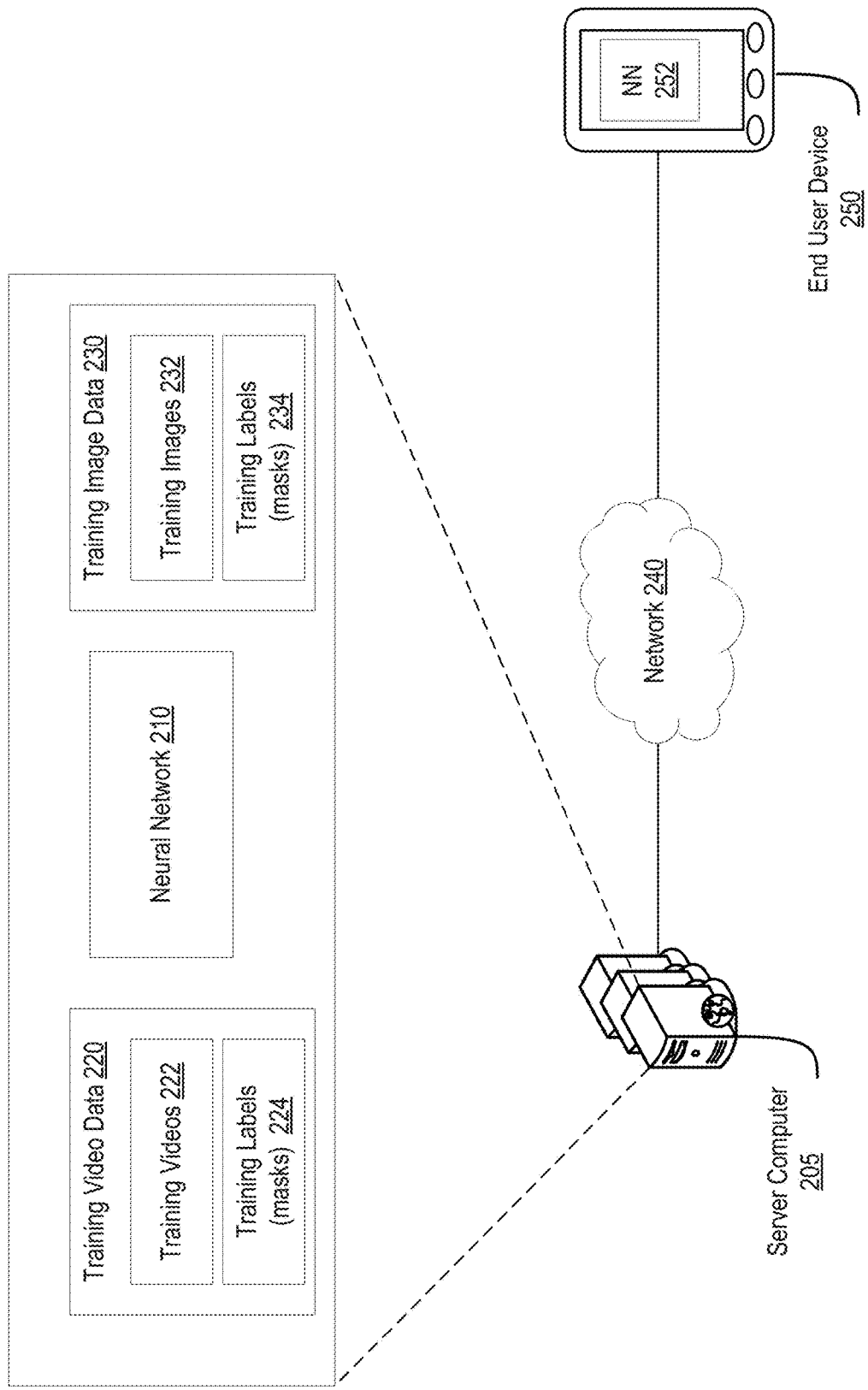
FIG. 2 illustrates an example computer system for performing video object segmentation by training and using a neural network according to certain embodiments.

FIG. 2 illustrates an example computer system 200 for performing video object segmentation by training and using an example neural network 210 according to certain embodiments. As illustrated, example computer system 200 includes a server computer 205 and an end user device 250. Generally, server computer 205 can be operated to train neural network 210. Once trained, neural network 210 is available for use by end user device 250 in support of different video-related applications hosted on end user device 250, such as video analysis and editing applications.

In an example, server computer 205 stores training video data 220. In some embodiments, training video data 220 includes training videos 222 and training labels 224. A training video represents a video from a collection of videos available for training neural network 210. A training label 224 is associated with a training video or a frame of the training video and indicates certain attributes of the training video. For example, the training label may be a mask of a target object in a video. The training label can be stored in, for example, the metadata of the training video or an additional channel (e.g., in addition to the red (R), green (G), and blue (B) channels) of the training video. The process of generating training videos 222 and training labels 224 may be time consuming and costly. In some implementations, public training datasets, such as the DAVIS-2016 and DAVIS-2017 training datasets, may be used for training neural network 210. However, the public training datasets are very limited and include, for example, less than a few hundred training videos.

In some embodiments, server computer 205 stores or generates training image data 230. Training image data 230 includes training images 232 and training labels (e.g., masks) 234. A training image 232 represents a frame of a video. A training label 234 is associated with a training image 232 and indicates certain attributes of the training image. In one example, the training label includes a mask of a target object in a training image. The training label can be stored in, for example, the metadata of the training image or an additional channel (e.g., in addition to the red (R), green (G), and blue (B) channels) of the training image. In some implementations, training image data 230 includes synthesized training images and labels that are generated from static images through, for example, transformations (e.g., rotation, scaling, color perturbation, etc.) and/or combinations (e.g., cropping, blending, etc.)

Based on training video data 220 and/or training image data 230, server computer 205 can train neural network 210 to determine parameters of neural network 210, such as weights or filters of various convolutional layers or fully connected network layers. The parameters of neural network 210 can be determined by, for example, back propagation of errors or loss values between pixel values of a training segmentation mask and pixel values of a segmentation mask generated by neural network 210 for a same training video frame or training image. Example methods for training neural network 210 are described in detail below with respect to FIGS. 9A-12.

In some embodiments, end user device 250 communicates with server computer 205 over a network 240, such as one involving the Internet. Once trained, neural network 210 can be downloaded to end user device 250 (shown as an instance 252 of neural network 210 on end user device 250 in FIG. 2) from server computer 205. Updates to neural network 210 can be pushed or pulled from server computer 205 to end user device 250. Additionally or alternatively, end user device 250 may not download neural network 210. Rather, when a target video is to be segmented, end user device 250 sends a request or a call (e.g., an application programming interface (API) call) and the target video over network 240 to server computer 205, which performs the requested video object segmentation on each of the frames of the target video to generate a corresponding segmentation mask for the frame. Server computer 205 then sends a response, such as segmentation data (e.g., segmentation masks), annotated video with an additional channel for the mask, or a link to the segmentation data or annotated video, over network 240 back to end user device 250, which would segment the video or edit the video based on the segmentation masks. Alternatively, server computer 205 can also perform the segmentation and/or editing of the target video based on the segmentation masks, and send the final results to end user device 250. The operations for video object segmentation can also be distributed between end user device 250 and server computer 205 in other ways.

Most deep neural network-based video object segmentation techniques are detection-based or propagation-based methods. Detection-based methods generally learn the appearance of a target object from a given annotated frame, and perform a pixel-level detection of the target object at each target frame. For example, the one shot video object segmentation (OSVOS) method (a detection-based method) takes the first video frame and builds an appearance model of the object using a convolutional neural network (CNN). It then classifies the pixels in a target frame according to the learnt appearance model. The OSVOS method segments the target frames independently. There is no use of the temporal information in the video. Because the detection-based methods rarely depend on temporal consistency, they can be robust to occlusion and drifting.

FIGS. 3A-3F illustrate an example detection-based method 300 for video object segmentation, such as the OSVOS method. In detection-based method 300, a neural network (e.g., a CNN) pre-trained for image recognition or classification is often adopted as the base neural network for video object segmentation. The base neural network is then trained on a set of video training data to build a parent network. At inference time, the parent network is fine-tuned using a target object identified in a single frame to generate a test network, and the test network is then used to segment each frame of the target video independently.

Figure 3A:
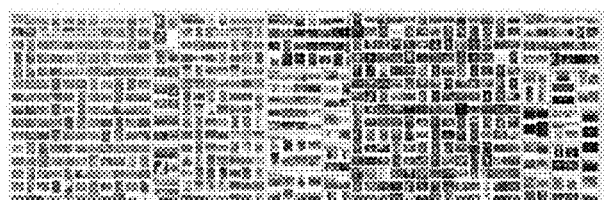
FIGS. 3A-3F illustrate an example detection-based method for video object segmentation.
Figure 3B:

FIG. 3A illustrates example training images 310 for training a neural network for image labeling. Training images 310 include images from, for example, ImageNet. The neural network includes, for example, a VGG-16 network pre-trained for image classification. The neural network can be converted to a fully convolutional network (FCN). In some implementations, the fully connected layers at the end of the network is removed, and a pixel-wise sigmoid balanced cross entropy is inserted to classify each pixel into foreground or background. The modified fully convolutional network can be used as the base neural network for video object segmentation. FIG. 3B illustrates results 320 of video object segmentation for a video frame using the base neural network. As shown in FIG. 3B, the results show that the performance of the base neural network is not very good in term of video object segmentation.

Figure 3C:
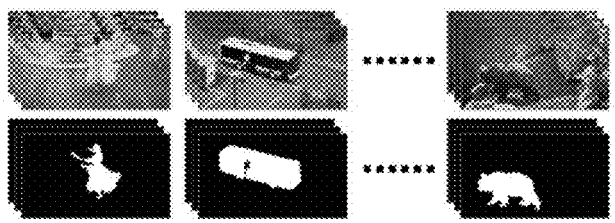
Figure 3D:

FIG. 3C illustrates an example video training dataset 330 for training the base neural network for video object segmentation. Example video training dataset 330 includes, for example the DAVIS-2016 training set or DAVIS-2017 training set. The base neural network can be trained using the video training dataset to generate a parent network. FIG. 3D illustrates results 340 of video object segmentation for a video frame using the parent network. As shown in FIG. 3B, results 340 improves over results 320 shown in FIG. 3B, but are still not focused on a specific object.

Figure 3E:
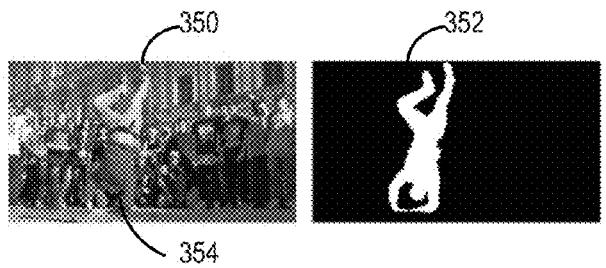
Figure 3F:

FIG. 3E illustrates an example video frame 350 (e.g., the first frame) in a target video sequence and a corresponding segmentation mask 352. Segmentation mask 352 includes a ground-truth annotation for video frame 350 that identifies a foreground object 354 in video frame 350. A test network can be created for the target video stream from the parent network based on the ground-truth annotation for video frame 350, where the test network can first be initialized with the weights trained using video training dataset 330 and then fine-tuned using video frame 350 and segmentation mask 352. The resultant test network is a unique, one-time-use model for the specific target video stream that is over-fitted for the specific video stream according to the first frame annotation. FIG. 3F shows results 360 of video object segmentation for a video frame using the test network. As shown by results 360, the test network can accurately identify and focus on the target object in other frames in the target video stream.

As discussed above, the test network is specific for a specific target video sequence. The test network may not work as well for another target video. In addition, because the estimation is mostly based on the appearance of the object in an annotated frame, the test network often fails to adapt to appearance changes and has difficulty separating objects with similar appearances. Furthermore, as shown by FIGS. 3D and 3F, for detection-based methods, it is generally necessary to fine-tune the network for the target object that appears in the reference frame (usually the first frame) (i.e., online training). Online training can add extra runtime as it trains deep network at inference time. For example, it can add more than a minute per testing sequence. In addition, the online training often requires special hardware such as GPUs, TPUs, etc. Thus, online training may limit the practical use of the detection-based methods.

Propagation-based methods mainly leverage the temporal coherence of object motion and formulate the video object segmentation as object mask propagation (i.e. pixel-level tracking) starting from a given annotated frame (e.g., segmentation masks or scribbles at key frames) that roughly specify the target object. These methods rely on the spatio-temporal connections between pixels, and thus can adapt to complex deformation and movement of a target object so long as the changes in the appearance and the location are smooth. However, these methods are vulnerable to temporal discontinuities, and can suffer from drifting once the propagation becomes unreliable.

Figure 4:
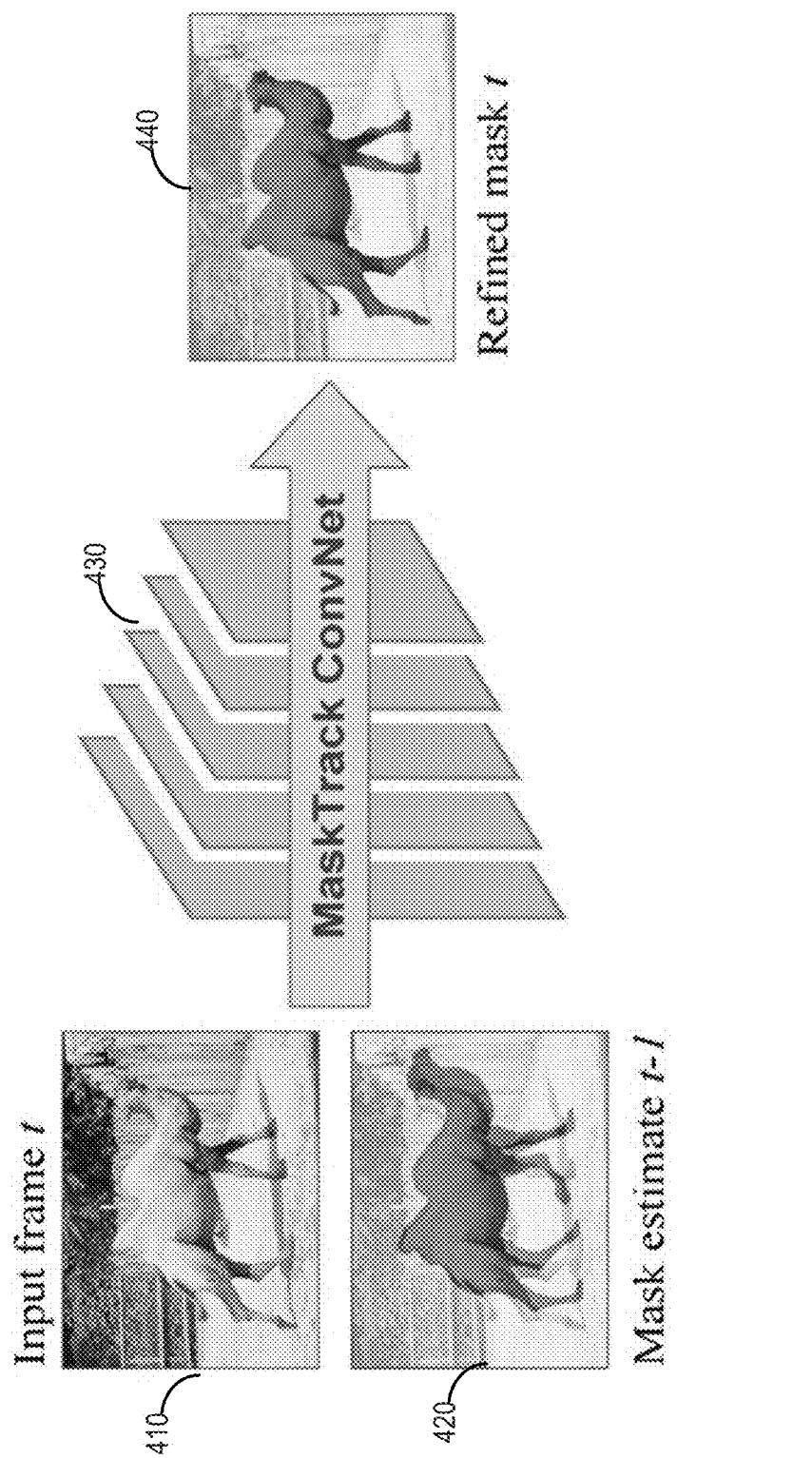
FIG. 4 illustrates an example propagation-based method for video object segmentation.

FIG. 4 illustrates an example propagation-based method for video object segmentation. For each input frame t (410), an estimated mask 420 of the previous frame t−1 is fed as additional input to a convolutional neural network (ConvNet) 430 to generate an estimated mask 440 for input frame t. In some embodiments, the input to ConvNet 430 includes 4 channels (RGB and the previous mask). This process generally starts with using the ground-truth mask for the first frame as the estimated mask 420. ConvNet 430 can be based on, for example, DeepLab VGG-16, and can be trained offline using image saliency datasets (including static images and the corresponding ground-truth masks) to segment objects. In some implementations, estimated mask of the previous frame is artificially synthesized by small transformations of the ground-truth mask of each static image. In some implementations, an identical second network is added to improve the overall performance. The second network computes a second mask using the magnitude of the optical flow field as input image (replicated into a three channel image). The optical flow is the pattern of apparent motion of objects, surfaces, and edges in a visual scene caused by the relative motion between an observer and a scene. The optical flow field is a 2-D vector field where each vector is a displacement vector showing the movement of points from a frame to the next frame. The outputs of both networks are then fused by averaging the output scores of the two networks. An online training is then performed to fine tune the network using training data generated from the first frame of a video stream and the ground-truth mask of the first frame.

The propagation-based methods are vulnerable to temporal discontinuities, such as occlusions and rapid motions, and can suffer from drifting once the propagation becomes unreliable. As described above, most of propagation-based methods also use online training to improve accuracy, which requires extra runtime and hardware resources to train the deep network at inference time. Thus, the propagation-based methods can also have limited practical use.

According to certain embodiments, a neural network including two encoders (e.g., a Siamese encoder network) is used to both detect a target object in a video stream by matching the appearance of the target object in a reference frame and track the segmentation mask by referencing the previous segmentation mask in the current frame. One of the two encoders extracts features from the target video frame and the previous segmentation mask, while the other encoder extracts features from the reference video frame (e.g., the first video frame of a video stream) and the ground-truth segmentation mask of the reference video frame. The extracted features may then be combined and used to extract the segmentation mask for the target frame. In some embodiments, a two-stage training process is used to pre-train the network using synthetically generated training images and then fine-tune the network using training videos. In this way, the network can be trained using limited segmented training videos. The fine-tuned network can be used to segment any video stream using a reference frame (e.g., the first frame) of the video stream and a corresponding ground-truth segmentation mask, without requiring online training or post processing. As a result, the video can be segmented at a higher speed and/or using fewer hardware resources.

Figure 5:
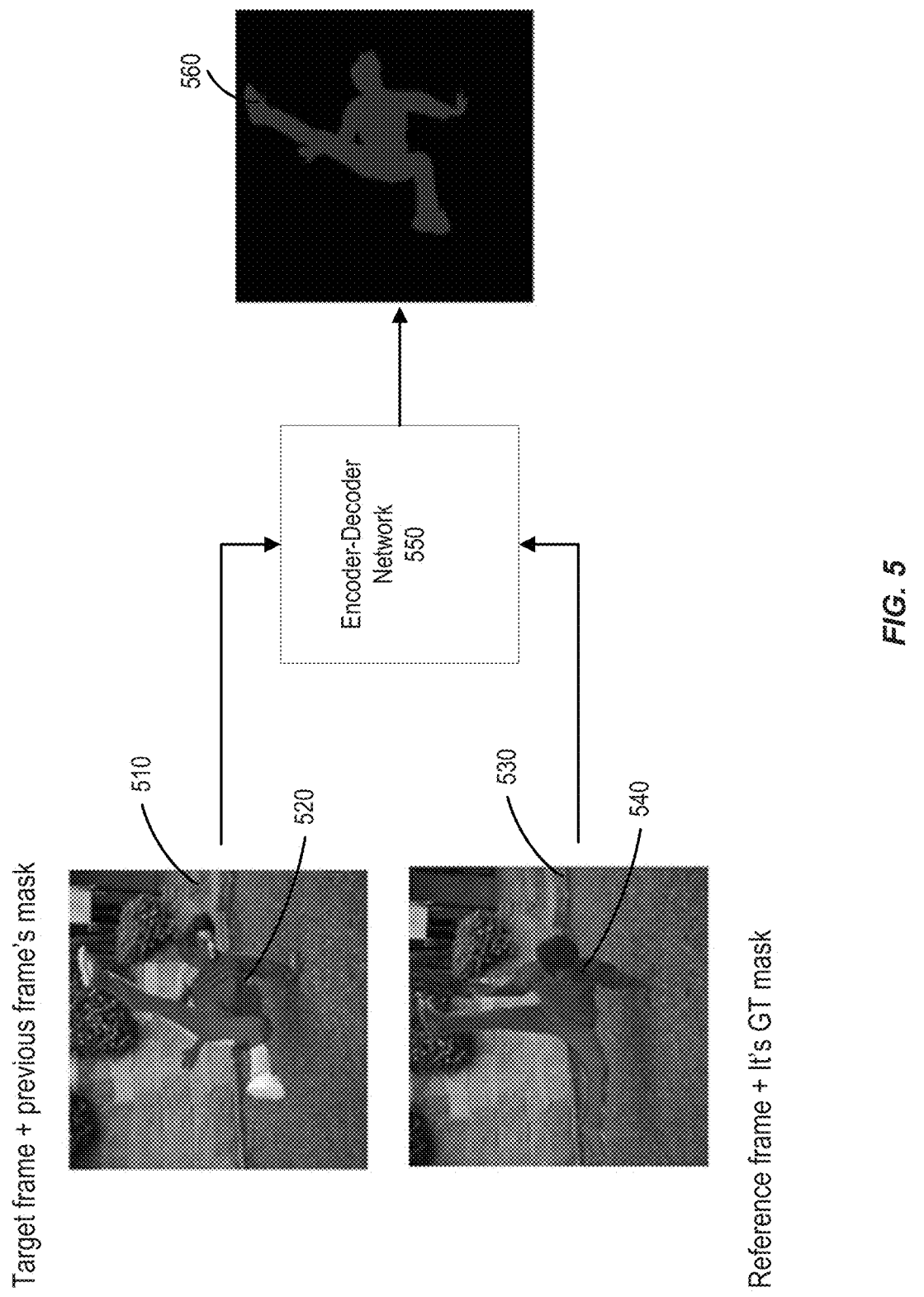
FIG. 5 illustrates an example method of video object segmentation using a reference-guided mask propagation technique according to certain embodiments.

FIG. 5 illustrates an example method of video object segmentation using a reference-guided mask propagation (RGMP) technique according to certain embodiments. As illustrated, an encoder-decoder network 550 takes inputs of a target frame 510 and an estimated mask 520 of the previous frame, and a reference frame 530 and a ground-truth mask 540 of reference frame 530, and outputs an estimated mask 560 for target frame 510. Reference frame 530 and ground-truth mask 540 of reference frame 530 can help to detect a target object in target frame 510, and estimated mask 520 of the previous frame can be propagated to target frame 510 to estimate mask 560 for target frame 510.

Figure 6:
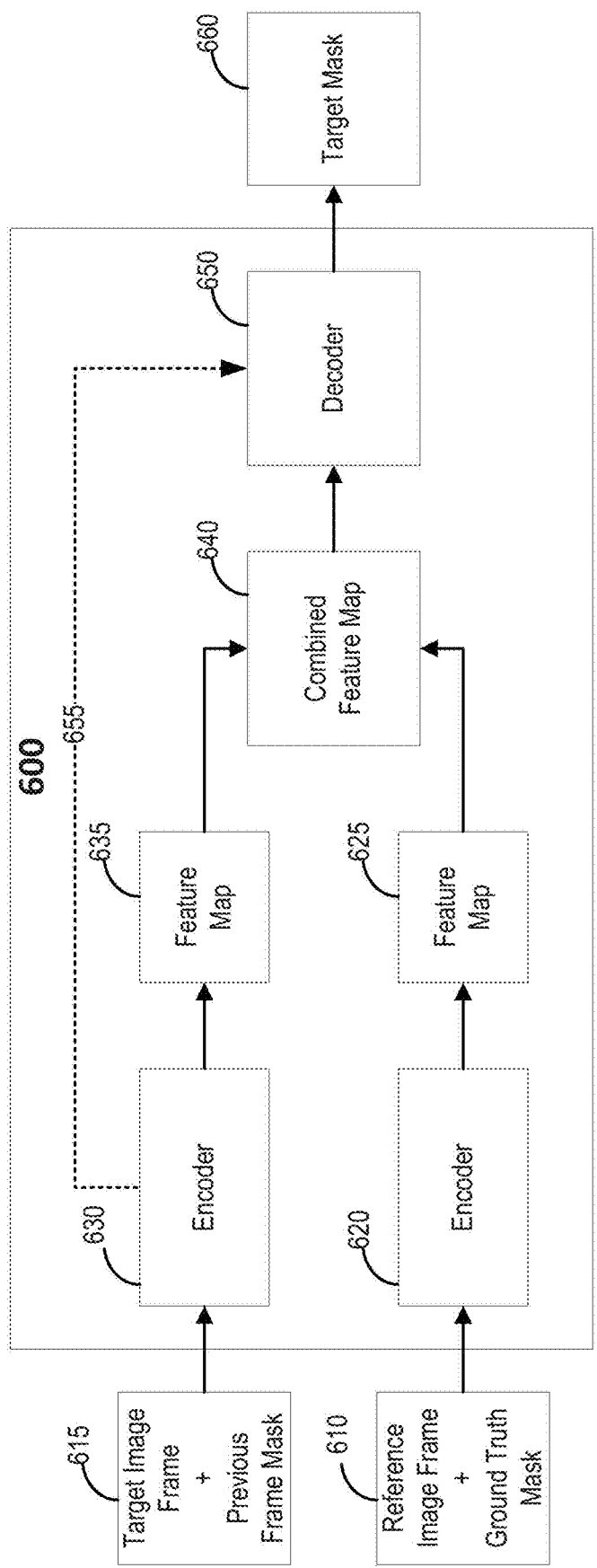
FIG. 6 is a simplified block diagram of an example neural network for video object segmentation using a reference-guided mask propagation technique according to certain embodiments.

FIG. 6 is a simplified block diagram of an example neural network 600 for video object segmentation using a reference-guided mask propagation technique according to certain embodiments. Neural network 600 is an example implementation of encoder-decoder network 550. Neural network 600 includes a first encoder 620 and a second encoder 630. First encoder 620 takes an input 610, which includes a reference video frame and the ground-truth mask, and extracts a feature map 625 from input 610. Second encoder 630 takes an input 615, which includes a target video frame in a video stream and an estimated mask of the previous video frame in the video stream, and extracts a feature map 635 from input 615. In some implementations, first encoder 620 and second encoder 630 are identical, including the structure and the parameters (e.g., weights), and thus only one encoder needs to be trained. In some implementations, first encoder 620 and second encoder 630 are different in structure or parameters, and thus need to be trained individually. Feature map 625 and feature map 635 are combined (e.g., concatenated) to form a combined feature map 640. A decoder 650 then generates an estimated target mask 660 based on combined feature map 640. In some implementations, decoder 650 generates target mask 660 based on combined feature map 640 and features extracted at various stages of encoder 630 through, for example, skip connections 655.

Figure 7:
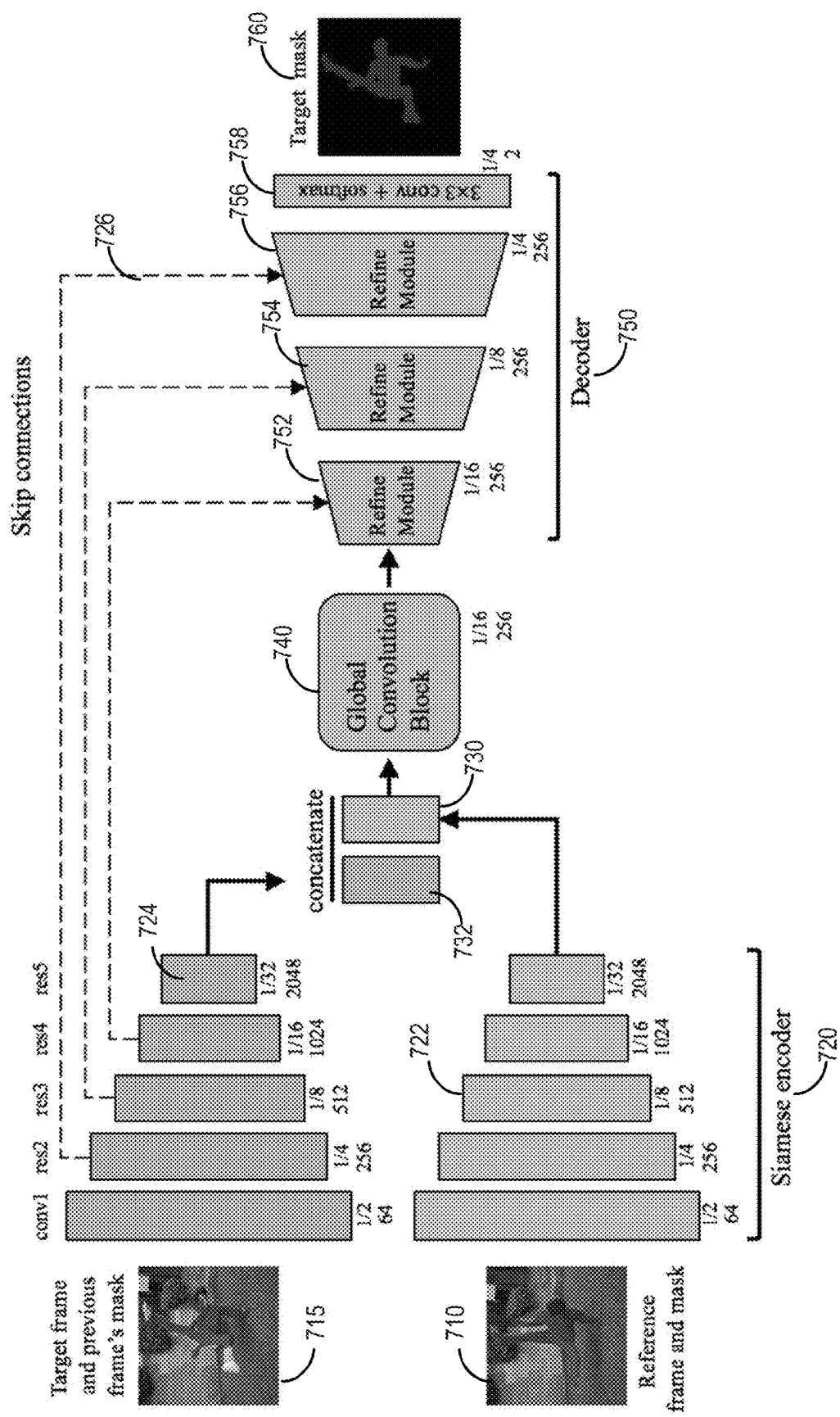
FIG. 7 is a simplified block diagram of an example Siamese encoder-decoder network for video object segmentation using a reference-guided mask propagation technique according to certain embodiments.

FIG. 7 is a simplified block diagram of an example encoder-decoder network 700 for video object segmentation using a reference-guided mask propagation technique according to certain embodiments. Encoder-decoder network 700 is a specific implementation of encoder-decoder network 550 or neural network 600. Other implementations of encoder-decoder network 550 or neural network 600 are possible. In the example shown in FIG. 7, encoder-decoder network 700 includes a Siamese encoder network 720, a global convolution block 740, and a decoder 750. The network is fully convolutional, and can handle arbitrary input size and generate sharp output masks. Example relative spatial scales and channel dimensions of feature maps for a specific implementation are shown below each block in FIG. 7.

Siamese encoder network 720 includes two encoder subnetworks with shared parameters. The two encoder subnetworks receive distinct inputs but are joined by an energy function at the top layer. The energy function computes some metrics between the high level features extracted by each subnetwork. The parameters (e.g., weights) of the two subnetworks may be tied or identical. Weight tying ensures that two similar images would not be mapped by their respective subnetworks to very different locations in feature space because the twos subnetwork perform the same operations. Because the network is symmetric, the top layer can compute the same metric even if the inputs to the two networks are swapped.

In the example shown in FIG. 7, Siamese encoder network 720 includes a reference frame encoder subnetwork (the bottom subnetwork) and a target frame encoder subnetwork (the top subnetwork). The reference frame encoder subnetwork takes inputs 710, which include a reference image (including RGB channels) and the corresponding ground-truth mask. In one embodiment, the reference image is the first frame in a video stream. The target frame encoder subnetwork takes inputs 715, which include a target image (including RGB channels) and an estimated mask for the previous frame in the video stream. The estimated mask for the previous frame is used as the guidance mask. The reference frame encoder subnetwork and the target frame encoder subnetwork share same network parameters and map the input data of the two encoder subnetworks into the same feature space.

Each of the reference frame encoder subnetwork and the target frame encoder subnetwork may include a fully convolutional neural network. In some implementations, a known convolutional neural network for static image classification, such as ResNet 50 or VGG-16, is adopted and modified (e.g., adding a fourth channel for the mask in addition to the R, G, and B channels, and removing the fully connected layers) for use as the reference frame encoder subnetwork and the target frame encoder subnetwork. In some implementations, the network parameters are initialized from an ImageNet pre-trained neural network, such as ResNet 50 or VGG-16, and the newly added filters for the mask channel can be initialized randomly.

Each encoder subnetwork includes a set of blocks 722 or 724, where each block 722 or 724 includes, for example, a convolution, rectified linear non-linearity (ReLU), and pooling layers. In the example shown in FIG. 7, a ResNet 50 network is used for each encoder subnetwork. Each convolution layer in block 722 or 724 performs convolutions with a filter bank to produce a set of feature maps. The number of filters in the filter bank indicates the depth of the convolution layer and the channel dimensions of the feature maps (indicated by the integer number below each block, such as 64, 256, 512, 1024, 2048, etc.). An element-wise ReLU function y=max(0, x) is applied to the feature maps. A max-pooling with, for example, a 2×2 window and stride 2, is then performed on the outputs of the ReLU function. The max-pooling sub-samples or down-samples the feature maps, and can be used to achieve translation invariance over small spatial shifts in the input frame. In some implementations, the resulting output from a pooling layer is further sub-sampled, for example, by a factor of 2. The sub-sampling can reduce the size of the feature maps while keeping the high level features of the frame. The operation at each block reduces the spatial dimensions of the image, which is indicated by the fractional number (e.g., ½, ¼, ⅛, 1/16, 1/32, etc.) below each block. Because of the gradual reduction in dimensions of the feature maps, there is a loss of spatial resolution in the feature maps. The increasingly lossy representation of the frame by the feature maps is not beneficial for segmentation where accurate boundary delineation is needed. In some implementations, boundary information in the encoder feature maps is captured and stored before the sub-sampling is performed. For example, in some implementations, the max-pooling indices (the locations of the maximum feature value in each pooling window) are stored for each encoder feature map.

Feature maps 730 extracted by the reference frame encoder subnetwork from the reference frame and the ground-truth mask, and feature maps 732 extracted by the target frame encoder subnetwork from the target frame and the estimated mask for the previous mask are combined, such as concatenated along the channel axis or by pixel-wise summation, and fed to global convolution block 740. Global convolution block 740 performs global feature matching between the reference frame and the target frame to localize the target object in the target frame.

Figure 8A:
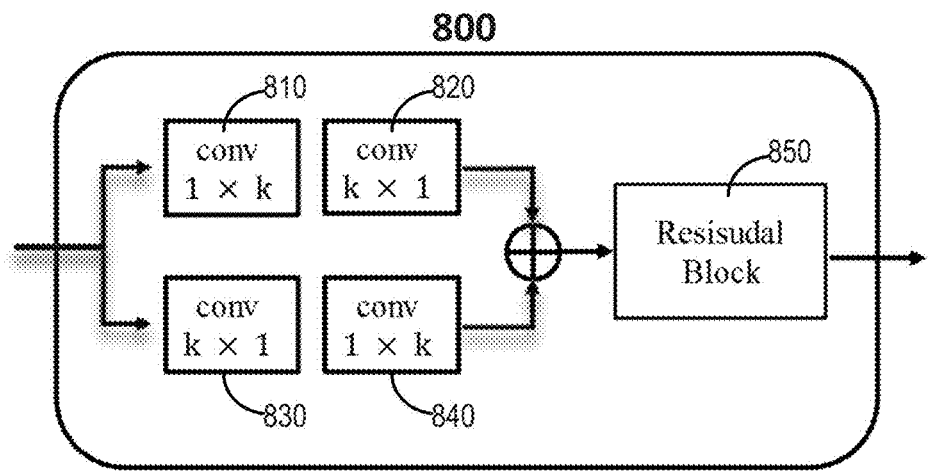
FIG. 8A is an example block diagram of an example global convolution block according to certain embodiments.

FIG. 8A is an example block diagram of an example global convolution block 800 according to certain embodiments. Global convolution block 800 is an example implementation of global convolution block 740. To overcome the locality of convolution operations, the kernel (filter) size of global convolution block 800 should be as large as possible. In some embodiments, a global convolution block that can efficiently enlarge the receptive field (equivalent to the filter size) is used. In one example, a k×k global convolution block is achieved by combining 1×k+k×1 and k×1+1×k convolution layers, to reduce the complexity of the global convolution block while enlarging the receptive field. In one example, k is 7. As shown in FIG. 8A, an example k×k global convolution block is achieved using a 1×k convolution layer 810 and a k×1 convolution layer 820 on one path, and a k×1 convolution layer 830 and a 1×k convolution layer 840 on another path, where the outputs from the two paths may be summed and further processed by a residual block 850. In the example shown in FIG. 8A, all convolution layers in global convolution block may produce a feature map with 256 channels (i.e., the number of filters is 256).

Figure 8B:
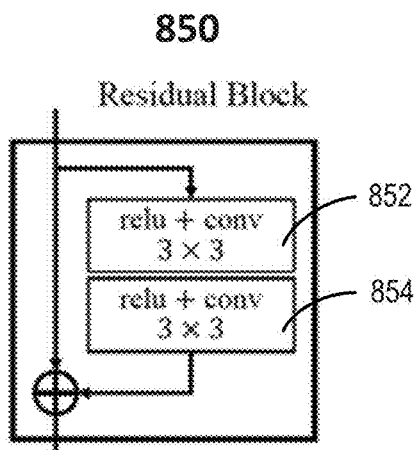
FIG. 8B is an example block diagram of an example residual block according to certain embodiments.

FIG. 8B is an example block diagram of an example residual block 850 according to certain embodiments. Residual block 850 is a feedforward neural network that includes a residual mapping path and a skip connection. The residual mapping path includes two or more convolution and ReLU layers 852 and 854. The skip connection enables copying the input to a layer directly to the next layer. By providing both the input and output of the residual block to the next layer, residual block 850 ensures that the next layer learns something new and different from the current layer.

Referring back to FIG. 7, decoder 750 takes the output of global convolution block 740 and, in some implementations, features in the target encoder stream through skip-connections, to produce an output mask. To efficiently merge features in different scales, a decoder can include multiple refinement modules. In the example shown in FIG. 7, decoder 750 includes three refinement modules 752, 754, and 756, and a final convolution and Softmax layer 758. Features from the refinement modules and the final convolution layer are passed into the Softmax layer to get the boundary labels of all pixels in the target frame. The Softmax layer takes a vector of real-valued scores and maps it to a vector of values between zero and one that sum to one. Every convolution layer in refinement module 752, 754, or 756 produces a feature map with 256 channels and final convolution and Softmax layer 758 produces a two-channel mask.

Figure 8C:
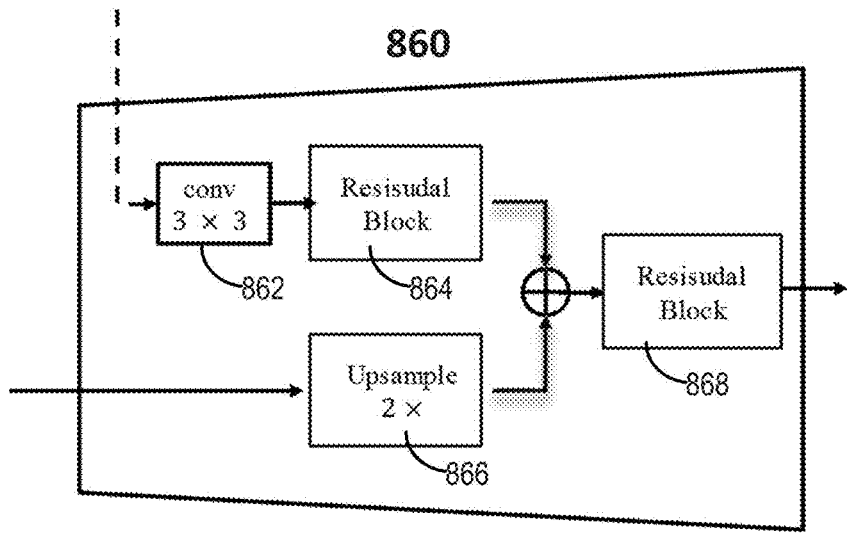
FIG. 8C is an example block diagram of an example refinement module according to certain embodiments.

FIG. 8C is an example block diagram of an example refinement module 860 according to certain embodiments. Refinement module 860 can be used to implement refinement module 752, 754, or 756 of FIG. 7. In the example shown in FIG. 8C, refinement module 860 includes an upsample block 866 on one path for upsampling the feature maps and increasing the dimensions of the feature maps. In the example shown in FIGS. 7 and 8C, each refinement module doubles the size of the feature maps. Refinement module 860 also includes a convolution layer 862 and a residual block 864 on a second path that takes inputs, such as the max-pooling indices, from a corresponding convolutional layer in Siamese encoder network 720 through skip connections 726. The outputs from the two paths are added and fed to another residual block 868.

The available training dataset for training a neural network for video object segmentation is generally very limited. For example, DAVIS-2017 is the largest public benchmark dataset for video object segmentation, and provides a training dataset including 60 videos. It is expensive to generate training dataset for video object segmentation, which requires generating the ground-truth mask for each video frame. For example, for a 5-second video clip at 25 frames per second, 125 ground-truth masks need to be generated. The available training dataset is generally not sufficient to train the deep neural network described above from scratch, even if pre-trained weights for the encoder are used. According to certain embodiments, a two-stage training scheme is used to address this issue, where the network is first trained on simulated samples using static image datasets and then fine-tuned using video segmentation data, such as the DAVIS-2017 dataset.

In the first stage, image datasets with object masks from, for example, Pascal VOC, extended complex scene saliency dataset (ECSSD), and MSRA10K, can be used to synthesize training samples, which include both the reference images and the corresponding target images, where each pair of reference image and target image include a same object. The training samples can be automatically generated using various strategies.

For example, in a first example synthesis strategy, a pair of images are generated from a static image with an object mask by applying two different sets of random transformations on the static image and the associated mask. The transformations include, for example, rotation, scaling, or color perturbation. In one example, images from the Pascal VOC dataset are used as the source images for synthesize the training images. This synthesis strategy can simulate environment changes, such as camera angle, zoom, or illumination of a static scene.

In a second example synthesis strategy, for a pair of images where one image includes a foreground object and another image includes a background image, two different sets of random transformations are applied to the foreground object, and a pair of images are generated by blending the transformed foreground images with the background image. For example, the foreground object can be segmented from the saliency detection datasets and the background images can be from the Pascal VOC dataset. In addition, occlusions can be simulated in the training images using the object mask in the background image. The second synthesis strategy can simulate more complex changes and cover a larger variety of object classes as the saliency detection datasets have more diverse classes of objects than the Pascal VOC dataset.

In both example synthesis strategies, the mask of the target frame can be deformed using a random affine transform to simulate the estimated mask for the previous frame. In some implementations, training sample that includes at least 50% of the target object is randomly cropped from each generated image. Study has shown that images generated using both example synthesis strategies are helpful. Thus, in some implementations, training samples are generated using both example strategies with an equal probability, and used to pre-train the encoder-decoder network described above.

Figure 9A:
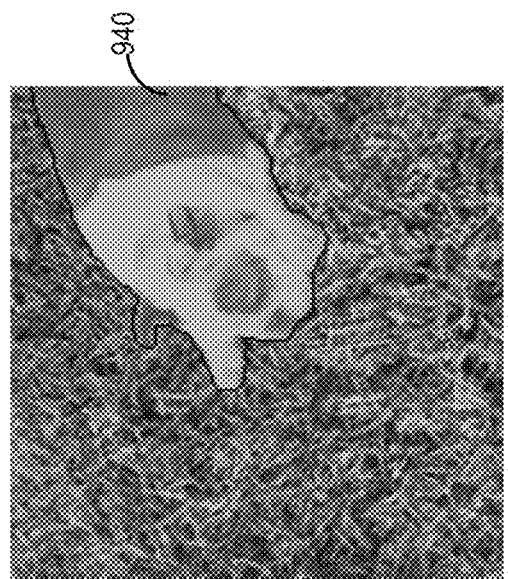
FIGS. 9A-9D illustrate example synthesized training samples generated from static images according to certain embodiments.
Figure 9B:
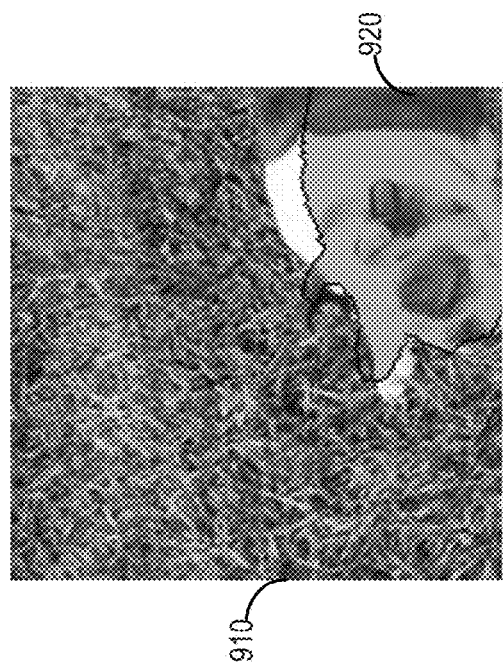
Figure 9C:
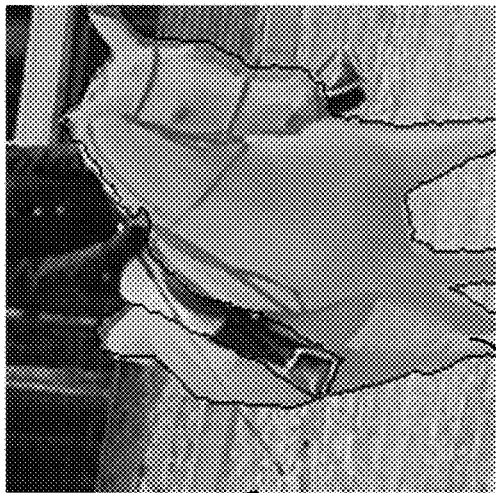
Figure 9D:
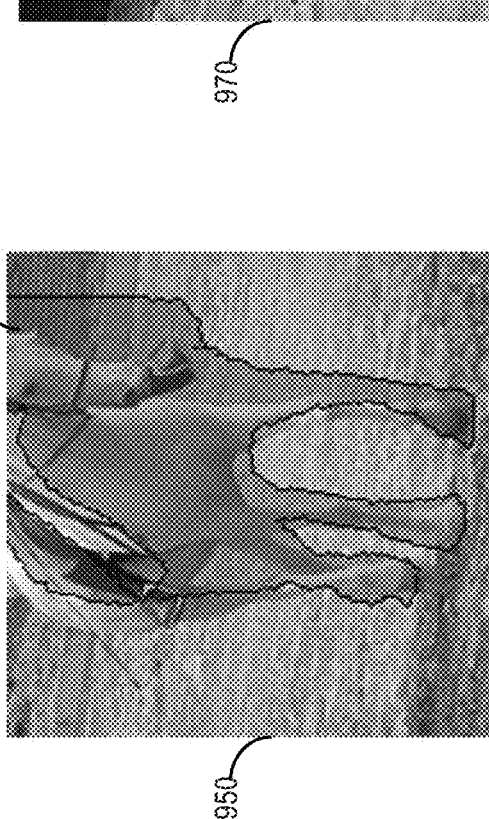

FIGS. 9A-9D illustrate example synthesized training samples generated from static images according to certain embodiments. The example synthesized training samples shown in FIGS. 9A-9D are generated using the first example synthesis strategy described above. FIG. 9A shows a target image 910 and a previous mask 920. FIG. 9B shows a reference image 930 and a ground-truth mask 940, where reference image 930 corresponds to target image 910 but is transformed differently from target image 910. FIG. 9C shows a target image 950 and a previous mask 960. FIG. 9D shows a reference image 970 and a ground-truth mask 980, where reference image 970 corresponds to target image 950 but is transformed differently from target image 950. The example synthesized training samples look natural without artifacts.

Figure 10A:
FIGS. 10A-10D illustrate example synthesized training samples generated from static images according to certain embodiments.
Figure 10B:
Figure 10C:
Figure 10D:
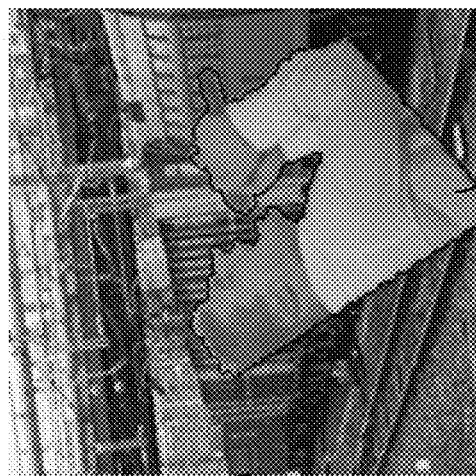

FIGS. 10A-10D illustrate example synthesized training samples generated from static images according to certain embodiments. The example synthesized training samples shown in FIGS. 10A-10D are generated using the second example synthesis strategy described above. FIG. 10A shows a target image 1010 and a previous mask 1020, where the target object (e.g., a butterfly) is at least partially occluded by an object (e.g., a person) in the background image. FIG. 10B shows a reference image 1030 and a ground-truth mask 1040, where reference image 1030 corresponds to target image 1010 but is transformed differently from target image 1010. FIG. 10C shows a target image 1050 and a previous mask 1060. FIG. 10D shows a reference image 1070 and a ground-truth mask 1080, where reference image 1070 corresponds to target image 1050 but is transformed differently from target image 1050. The generated images shown in FIGS. 10A-10D look unnatural and have blending artifacts.

After the encoder-decoder network is pre-trained using the synthesized static image samples as described above, the network can be fine-tuned using video training dataset that includes video segmentation data. When trained using real video streams, the encoder-decoder network can learn to adapt for long-term appearance changes (between the reference frame and the target frame) and short-term motions (between the target frame and the mask of the previous frame). As described above, one example training dataset for video object segmentation is the DAVIS-2017 training dataset that includes 60 short HD videos (4029 frames in total) with pixel-level instance label maps (e.g., masks). In some implementations, reference and target frames are taken at random time indices from a video stream for use as the training samples. For the training, only one target object is selected in the training samples if there are multiple target objects in the video.

Figure 11:
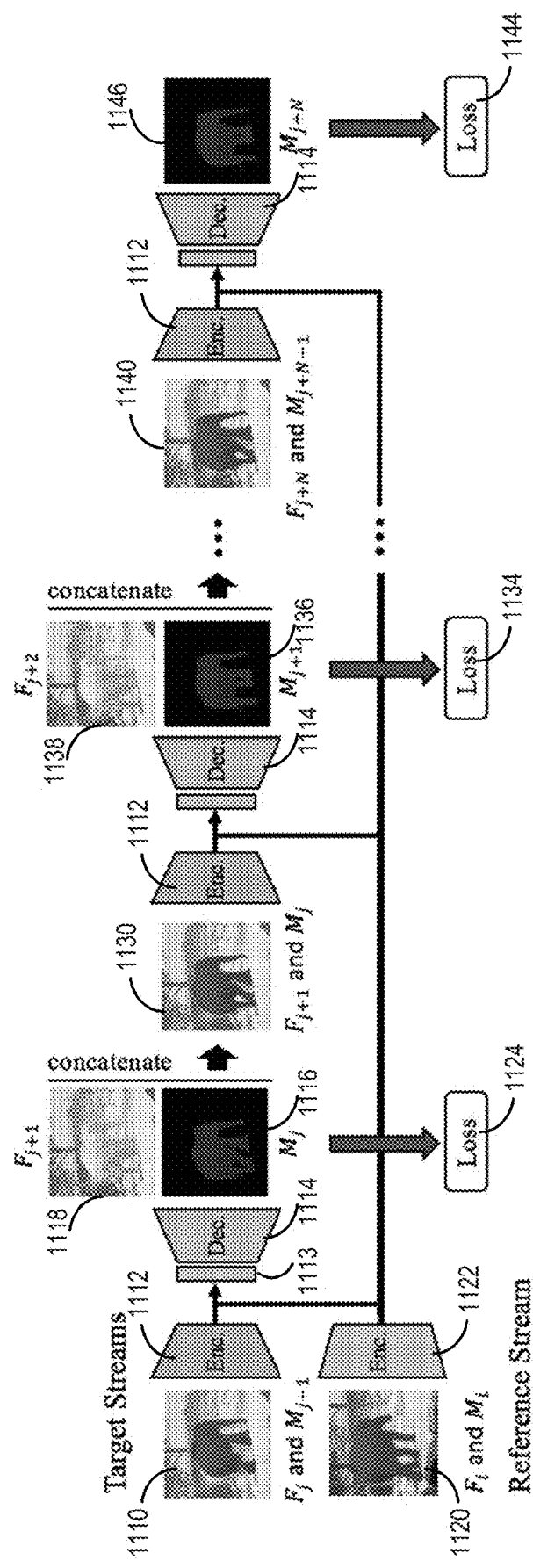
FIG. 11 illustrates an example process of recurrently training an example neural network for video object segmentation using training videos according to certain embodiments.

FIG. 11 illustrates an example process 1100 of recurrently training an example neural network for video object segmentation using training videos according to certain embodiments. In real inference scenario, errors may be accumulated over time because each estimation of the mask can include some errors. Process 1100 can simulate such error accumulation. In process 1100, during each recursion, estimated mask (or Softmax output) for a previous video frame is used as the guidance mask for the current video frame. Thus, the uncertainty of the estimation is preserved and the errors can be accumulated as in the real inference scenario. This allows the use of back-propagation-through-time (BPTT) for training the recurrently-connected network. In process 1100, N+1 successive target frames staring from a random time index in a video are used, where N is, for example, 5 or more.

As illustrated in FIG. 11, a reference frame $F_i$ and the corresponding ground-truth mask $M_i$ are used as a reference frame and mask 1120, where i is any integer number that is less than the total number of frames in a video stream. Reference frame and mask 1120 includes 4 channels, including a red (R) channel, a green (G) channel, a blue (B) channel, and a mask channel. In some implementations, the reference frame is the first frame in a video stream (i.e., i=0).

A set of N+1 consecutive video frames starting from a randomly selected number j is used as the target video frames for the recurrent training to fine tune the neural network for video object segmentation. In the first step, target video frame $F_j$ and the mask $M_{j-1}$ for target video frame $F_{j-1}$ are used as a target frame and guidance mask 1110, which includes an R channel, a G channel, a B channel, and a mask channel. Target frame and guidance mask 1110 is processed by encoder subnetwork 1112 to extract corresponding feature maps as described above with respect to FIGS. 6 and 7. Similarly, reference frame and mask 1120 is processed by encoder subnetwork 1122 to extract corresponding feature maps. As described above, in some implementations, encoder subnetwork 1112 and encoder subnetwork 1122 are identical. The feature maps generated by encoder subnetwork 1112 and encoder subnetwork 1122 can be combined as described above with respect to FIGS. 6 and 7. The combined feature map is processed by a decoder network 1114 to generate an estimated mask $M_j$ 1116 for video frame $F_j$. As described above, in some embodiments, decoder network 1114 includes a Softmax layer for generating estimated mask $M_j$ 1116. In some implementations, a global convolution block 1113, such as global convolution block 740 of FIG. 7, is used before decoder network 1114. Estimated mask $M_j$ 1116 for video frame $F_j$ can be compared with the ground-truth mask for video frame $F_j$ to determine a loss function 1124, which is back-propagated through the neural network to fine tune the parameters of the neural network.

In the next step, video frame $F_{j+1}$ 1118 and the estimated mask $M_j$ 1116 for video frame $F_j$ are combined into a 4-channel target frame and guidance mask 1130, which is then processed by encoder subnetwork 1112 to extract corresponding feature maps. The feature maps are combined with the feature maps extracted from reference frame and mask 1120 by encoder subnetwork 1122 as described above with respect to FIGS. 6 and 7. The combined feature map is processed by decoder network 1114 to generate an estimated mask $M_{j+1}$ 1136 for video frame $F_{j+1}$. Estimated mask $M_{j+1}$ 1136 for video frame $F_{j+1}$ can be compared with the ground-truth mask for video frame $F_{j+1}$ to determine a loss function 1134, which is back-propagated through the neural network to fine tune the parameters of the neural network. Estimated mask $M_{j+1}$ 1136 can be combined with target video frame 1138 to form a next target frame and guidance mask for the next training step.

In the (N+1)th step, video frame $F_{j+N}$ and the estimated mask $M_{j+N-1}$ for video frame $F_{j+N-1}$ are combined into a 4-channel target frame and guidance mask 1140, which is processed by encoder subnetwork 1112 to extract corresponding feature maps. The feature maps are combined with the feature maps extracted from reference frame and mask 1120 by encoder subnetwork 1122 as described above with respect to FIGS. 6 and 7. The combined feature map is processed by decoder network 1114 to generate an estimated mask $M_{j+N}$ 1146 for video frame $F_{j+N}$. Estimated mask $M_{j+N}$ 1136 for video frame $F_{j+N}$ can be compared with the ground-truth mask for video frame $F_{j+N}$ to determine a loss function 1144, which is back-propagated through the neural network to fine tune the parameters of the neural network.

As shown in FIG. 11, in some embodiments, the feature maps are extracted from reference frame and mask 1120 once and used in each recursion. In some embodiments, some video frames of a video are randomly skipped to simulate fast motions. In some embodiments, the training samples are augmented using a random affine transformation. In some embodiments, stochastic optimization, such as the Adam optimizer that only uses first-order gradients with little memory requirement, is used for efficient optimization during training. In some embodiments, the learning rate for the Adam optimizer is a fixed learning rate 1e-5.

Figure 12:
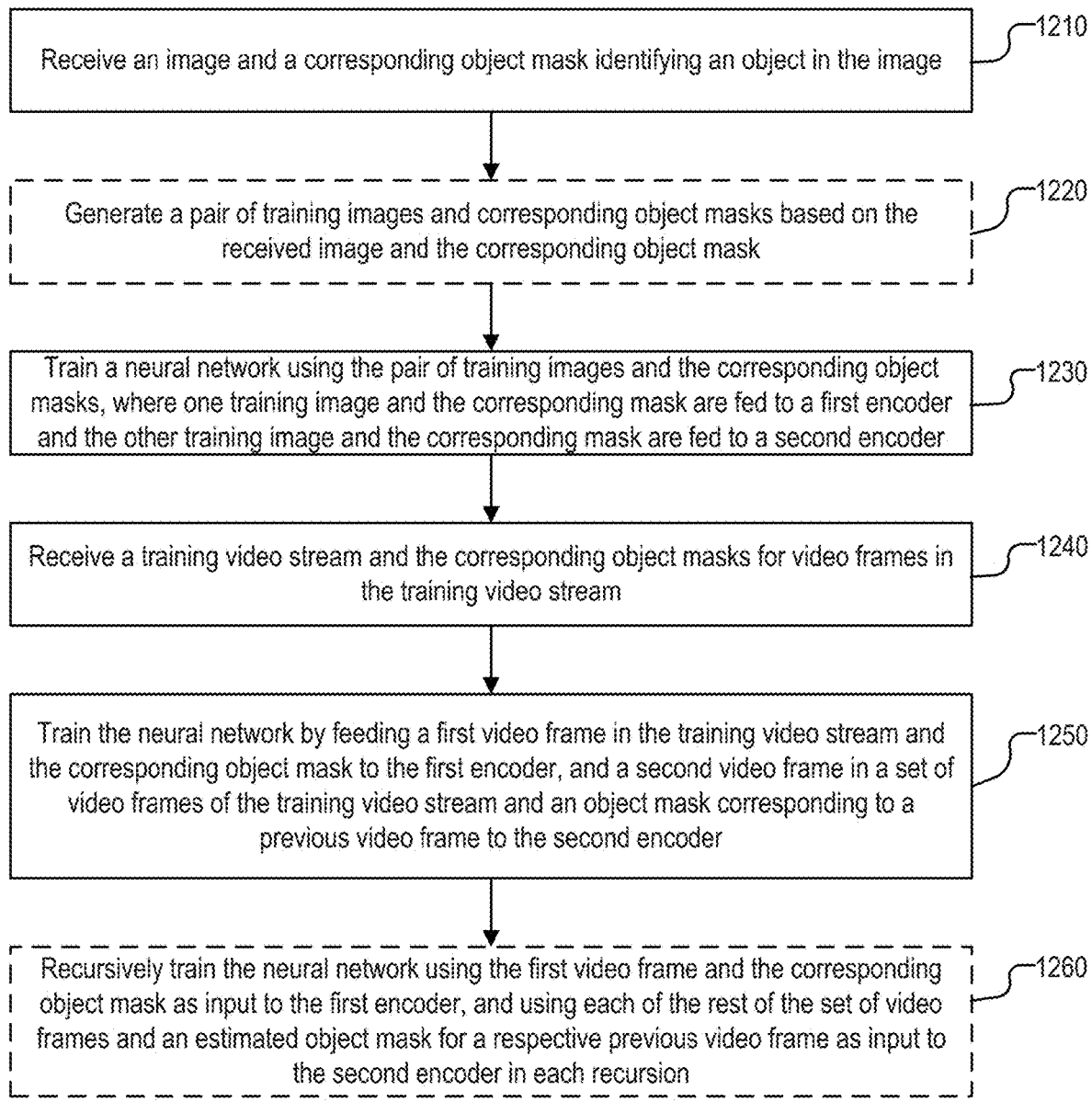
FIG. 12 is a simplified flow chart illustrating an example method for training an example neural network for video object segmentation according to certain embodiments.

FIG. 12 is a simplified flow chart 1200 illustrating an example method for training an example neural network for video object segmentation according to certain embodiments. As described above, due to the limited available video training dataset, a two-stage training process is used in some implementations to train the neural network for video object segmentations. In the first stage, the network is trained using static images, where the static images and the corresponding object masks are synthesized from available image training dataset. In the second stage, the network may be fine-tuned using video training dataset. In some implementations, the network is fine-tuned recursively using a set of consecutive video frames in the video training dataset, where the estimated object mask for a video frame is used as the guidance mask for the next video frame in the set. The method can be performed by one or more processing devices as described with respect to, for example, FIG. 2 and FIG. 19.

At block 1210, an image and a corresponding object mask identifying an object in the image are received by one or more processing devices. As described above, the image can be from one or more available image training datasets, such as Pascal VOC, ECSSD, and MSRA10K. The image training datasets include corresponding object masks for the images.

Optionally, at block 1220, a pair of training images and corresponding object masks are synthesized based on the received image and the corresponding object mask. As described above, in some embodiments of the neural networks disclosed herein for video object segmentation, two encoders are used. One encoder takes a reference image and a ground-truth object mask that identifies an object in the reference image as inputs, and the other encode takes a target image that includes the same object and a guidance object mask as inputs. Thus, two images including the same object may be needed. If there are no two images including the same object in the available image training datasets, images including the same object can be synthesized from the available images. There are many different ways to generate the pair of images including the same object and the corresponding object masks, such as the synthesis strategies described above with respect to FIGS. 9A-9D and 10A-10D.

At block 1230, the neural network including two encoders is trained using the pair of training images and the corresponding object masks, where one training image is fed to a first encoder of the two encoders as a reference image and the other training image is fed to a second encoder as a target image.

At block 1240, a training video stream and the corresponding object masks for video frames in the training video stream are retrieved or otherwise received. Examples of the video training dataset include the DAVIS-2016 training set and the DAVIS-2017 training set.

At block 1250, the neural network is trained by feeding a reference video frame (e.g., the first video frame in a video stream) in the training video stream and the corresponding object mask to the first encoder, and a video frame in a set of consecutive video frames of the training video stream and an object mask corresponding to a previous video frame to a second encoder of the two encoders. As described above with respect to FIG. 11, an estimated object mask for the video frame can be generated by the neural network, and compared with the known object mask for the video frame from the training dataset to fine tune the parameters of the neural network.

Optionally, at block 1260, the neural network may be trained recursively using the reference video frame and the corresponding object mask as inputs to the first encoder, and using each of the rest of the set of video frames and an estimated object mask for a respective previous video frame as inputs to the second encoder in each recursion. As described above with respect to FIG. 11, to simulate the segmentation errors accumulated over time, the estimated object mask for a video frame can be used as the guidance mask for the next video frame. For example, the estimated object mask for the first video frame in the set of consecutive video frame is used as the guidance mask for the second video frame in the set and is combined with the second video frame to feed to the second encoder. The estimated object mask for the second video frame is in turn used as the guidance mask for the third video frame in the set and is combined with the third video frame to feed to the second encoder. As described above, in some implementations, five or more recursions are performed.

During the inference, in general, the ground-truth mask for one video frame (e.g., the first frame) of a video is given or otherwise known. To estimate a mask for the next video frame, the video frame and the ground-truth mask are used as the reference for object detection, and the ground-truth mask is also used as the guidance mask for mask propagation. The estimated mask is then used to estimate the mask for the next video frame. In this way, the mask for each remaining video frame can be estimated sequentially. As in the training process described above with respect to FIG. 11, the reference video frame and the ground-truth mask can be used as the reference to estimate the masks for all remaining video frames, where feature maps are extracted from the reference video frame and the ground-truth mask once using an encoder, and are used for estimating the masks for all remaining video frames.

Figure 13:
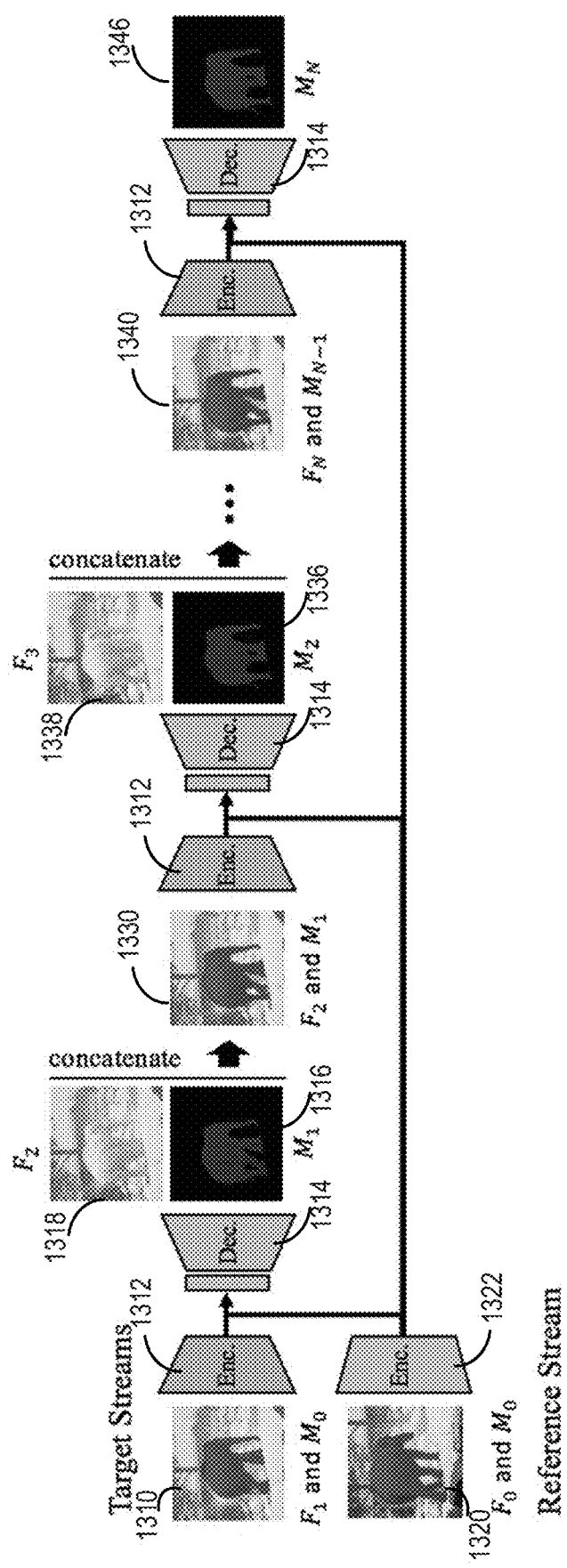
FIG. 13 illustrates an example process of segmenting a video stream using an example neural network for video object segmentation according to certain embodiments.

FIG. 13 illustrates an example process 1300 of segmenting a video stream using an example neural network for video object segmentation according to certain embodiments. In example process 1300, a reference frame $F_0$ (e.g., the first video frame of a video) and the corresponding ground-truth mask $M_0$ are combined to form a reference frame and mask 1320. As described above with respect to FIG. 11, in some embodiments, reference frame and mask 1320 includes 4 channels, including a red (R) channel, a green (G) channel, a blue (B) channel, and a mask channel. Target video frame $F_1$ and mask $M_0$ for reference frame $F_0$ are combined to form a target frame and guidance mask 1310, which also includes an R channel, a G channel, a B channel, and a mask channel. Target frame and guidance mask 1310 is processed by encoder subnetwork 1312 to extract corresponding feature maps as described above with respect to FIGS. 6 and 7. Similarly, reference frame and mask 1320 is processed by encoder subnetwork 1322 to extract corresponding feature maps. As described above, in some implementations, encoder subnetwork 1312 and encoder subnetwork 1322 are identical. The feature maps generated by encoder subnetwork 1312 and encoder subnetwork 1322 are combined as described above with respect to FIGS. 6 and 7. The combined feature maps is then processed by a decoder network 1314 to generate an estimated mask $M_1$ 1316 for video frame $F_1$. As described above, in some implementations, decoder network 1314 includes a Softmax layer for generating estimated mask $M_1$ 1316. In some implementations, a global convolution block 1313, such as global convolution block 740 of FIG. 7, is used before decoder network 1314.

Next, video frame $F_2$ 1318 and the estimated mask $M_1$ 1316 for video frame $F_1$ are combined into a 4-channel target frame and guidance mask 1330, which is processed by encoder subnetwork 1312 to extract corresponding feature maps. The feature maps are combined with the feature maps extracted from reference frame and mask 1320 by encoder subnetwork 1322 as described above with respect to FIGS. 6 and 7. The combined feature map is then processed by decoder network 1314 to generate an estimated mask $M_2$ 1336 for video frame $F_2$. Estimated mask $M_2$ 1336 is combined with video frame $F_3$ 1338 to form a next target frame and guidance mask for determining a mask for video frame $F_3$ 1338.

The above described mask estimation process can be performed for each remaining video frame in the video stream until the last video frame $F_N$ of the video stream. video frame $F_N$ and the estimated mask $M_{N-1}$ for video frame $F_{N-1}$ are combined into a 4-channel target frame and guidance mask 1340, which is then processed by encoder subnetwork 1312 to extract corresponding feature maps. The feature maps are combined with the feature maps extracted from reference frame and mask 1320 by encoder subnetwork 1322 as described above. The combined feature map is then processed by decoder network 1314 to generate an estimated mask $M_{j+N}$ 1346 for video frame $F_{j+N}$.

In some implementations, the output probability map of the previous frame is used as the guidance mask for the next frame without binarization. In some implementations, to capture objects at different sizes, the frames are processed in different input scales (e.g., 0.5, 0.75, and 1) and the results from which can be averaged.

Figure 14:
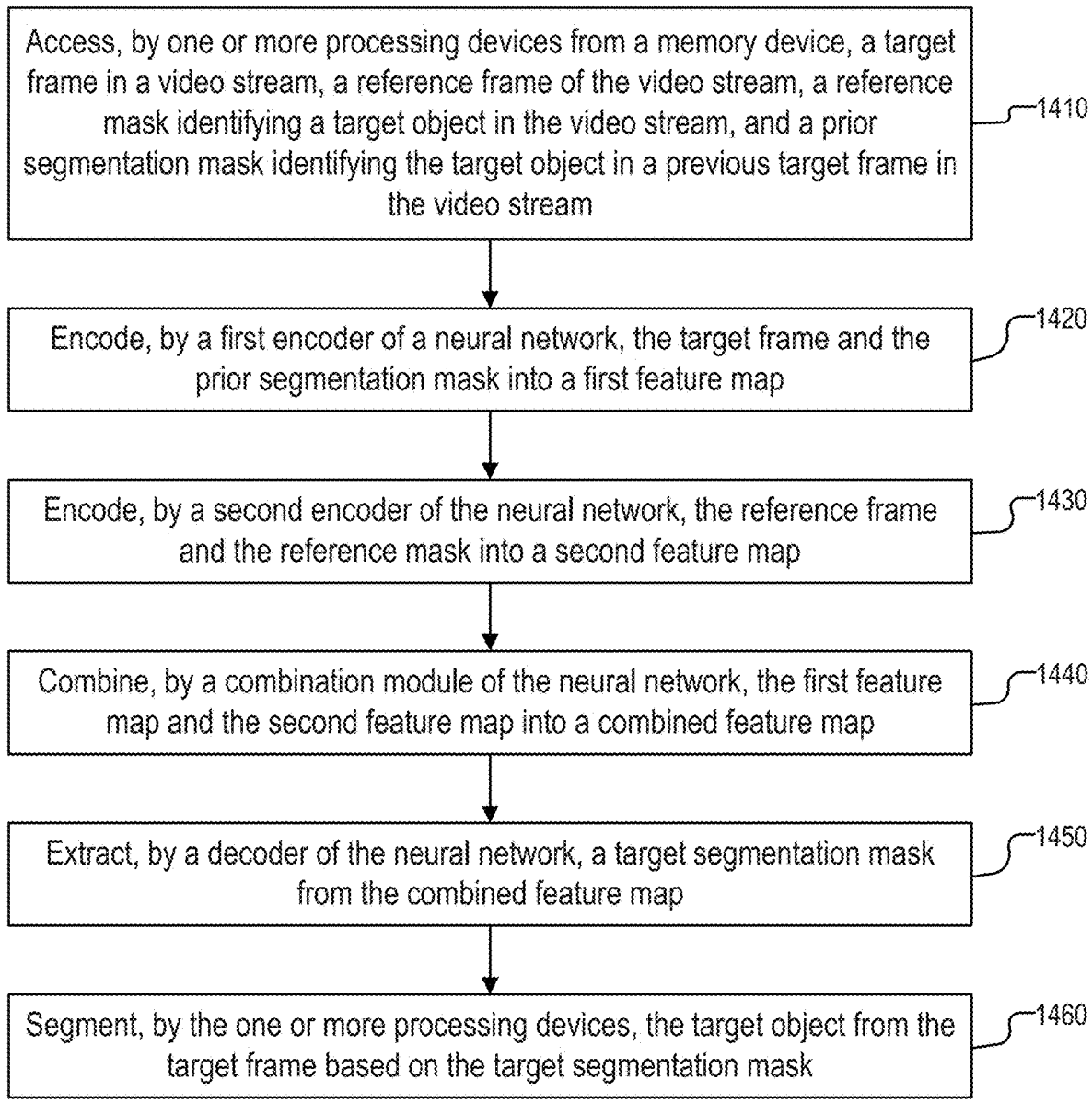
FIG. 14 is a simplified flow chart illustrating an example method of segmenting a video stream using an example neural network for video object segmentation according to certain embodiments.

FIG. 14 is a simplified flow chart 1400 illustrating an example method of segmenting an example video stream using a neural network for video object segmentation according to certain embodiments. In some embodiments, the neural network includes two encoders. The neural network uses a reference frame and a ground-truth mask of the reference frame as inputs to one encoder, and a target frame and a guidance mask as inputs to another encoder of the neural network. The reference frame and the ground-truth mask are used for detecting the target object in the target image, and the guidance mask is used for mask propagation. The method can be performed by one or more processing devices as described with respect to, for example, FIG. 2 and FIG. 19.

At block 1410, the one or more processing devices access data from a memory device. The data includes a target frame within the video stream, a reference frame of the video stream, a reference mask identifying a target object in the video stream, and a prior segmentation mask identifying the target object in a frame preceding the target frame within the video stream. In some examples, the reference frame is the first frame in the video stream, the reference mask is pre-determined before segmenting the video stream, and the target frame is any video frame that needs to be segmented.

At block 1420, a first encoder of the neural network encodes the target frame and the prior segmentation mask into a first feature map. As described above with respect to, for example, FIGS. 6 and 7, the first encoder includes multiple layers, such as multiple convolution layers, activation layers, and pooling layers. In one example, the encoder is a part of a Siamese encoder network.

At block 1430, a second encoder of the neural network encodes the reference frame and the reference mask into a second feature map. As described above with respect to, for example, FIGS. 6 and 7, the second encoder includes multiple layers, such as multiple convolution layers, activation layers, and pooling layers. In some embodiments, the first encoder and the second encoder have different network architectures and/or different network parameters (e.g., weights). In some embodiments, the first encoder and the second encoder have the same network architecture and network parameters (e.g., weights). In one example, the first encoder and the second encoder form a Siamese encoder network.

At block 1440, the first feature map and the second feature map are combined by a combination module of the neural network into a combined feature map. For example, as described above, the first feature map and the second feature map are concatenated along the channel axis or can be combined through pixel-wise summation.

At block 1450, a decoder (e.g., decoder 750) of the neural network extracts a target segmentation mask for the target frame from the combined feature map. In some implementations, the decoder includes one or more refinement modules as described above with respect to FIG. 7. In some implementations, the decoder includes a global convolution block, which performs global feature matching between the reference frame and the target frame to localize the target object in the target frame. In some implementations, the decoder includes a Softmax layer for classifying the pixels of the target image to generate the target segmentation mask.

At block 1460, the one or more processing devices segment the target object from the target frame based on the target segmentation mask for applications such as video analysis and editing.

FIGS. 12 and 14 illustrate example flows for training and using a neural network in connection with video object segmentation. A computer system hosting the neural network, such as one including computer system 200 and end user device 250 of FIG. 2, can be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

When there are multiple objects to be segmented from a video stream, the same network can be used, and the training can be based on a single object. In some embodiments, each object is segmented independently, and the label can be assigned based on the largest output probability. In some embodiments, a winner-take-all approach is used, where non-maximum instance probabilities are set to zeros at each estimation so that each pixel is only assigned to one object. The winner-take-all approach can improve the accuracy of multi-object segmentation, but may discard some useful information.

According to certain embodiments, a Softmax aggregation that combines multiple instance probabilities softly while constraining them to be positive and sum to 1 is used:

$$p_{i,m} = \sigma(logit(\hat{p}_{i,m})) = \frac{\hat{p}_{i,m}/(1-\hat{p}_{i,m})}{\sum_{j=0}^{M} \hat{p}_{i,j}/(1-\hat{p}_{i,j})},$$

where σ and logit represent the Softmax and logit functions, respectively; $\hat{p}_{i,m}$ is the network output probability of object m at the pixel location i; m=0 indicates the background; and M is the number of objects. The probability of the background can be determined by calculating the network output of the merged foreground and then subtracting the network output of the merged foreground from 1. For each frame, the network outputs for the objects are aggregated using the above equation at each time step and passed to the next frame.

Techniques disclosed herein have been applied on standard benchmark datasets and the performance has been compared with the performance of other methods. In addition, comprehensive ablation and add-on studies have been performed to determine the effect of some features of the disclosed techniques.

Figure 15:
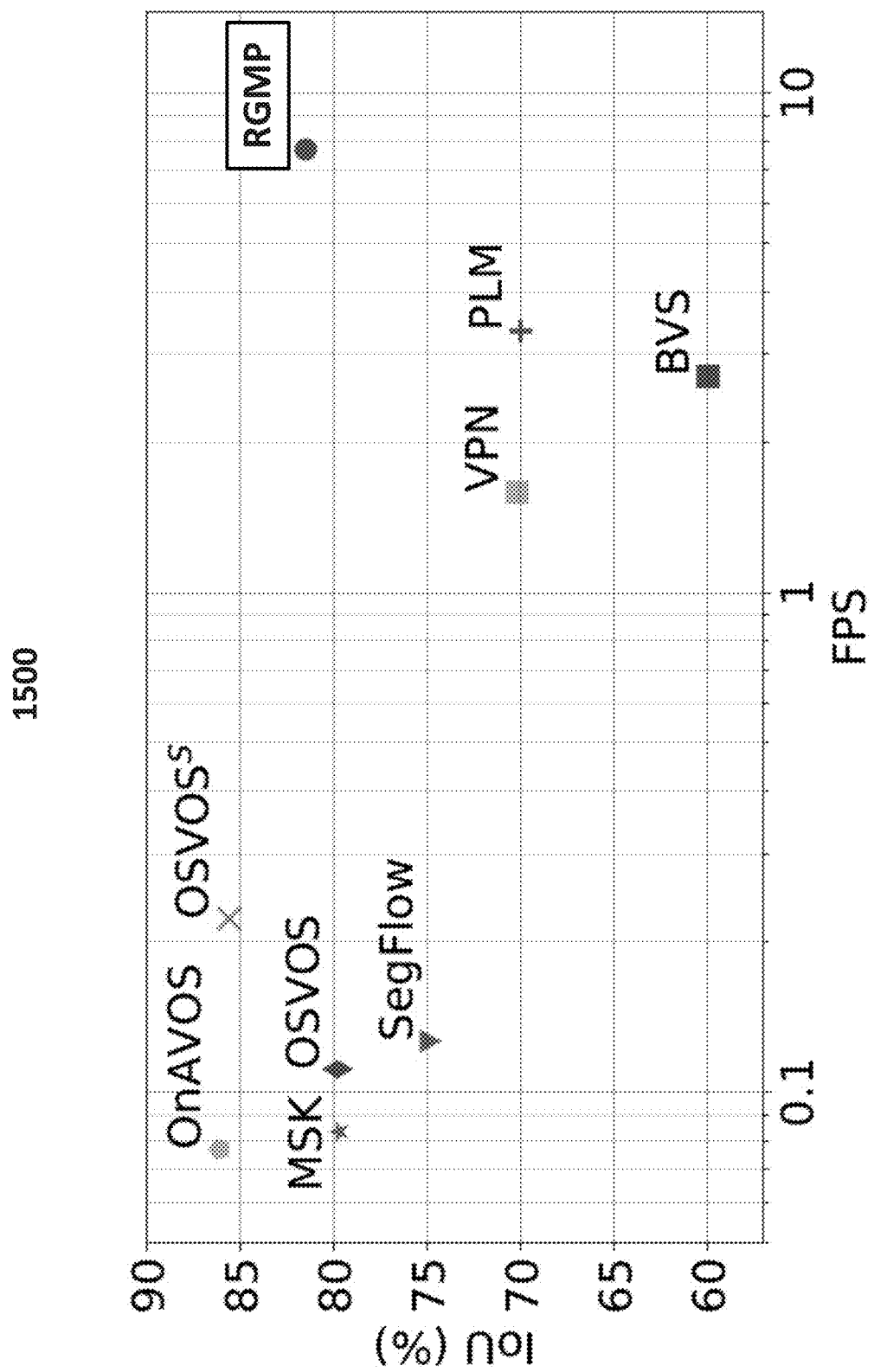
FIG. 15 is a chart showing the quality and speed of various video object segmentation techniques.

FIG. 15 is a chart 1500 showing the quality and speed of various video object segmentation techniques. The DAVIS-2016 dataset is used for the comparison. The x-axis of chart 1500 represents the processing speed in frame-per-second (FPS), and the y-axis represents the intersection over union (IoU) metric for measuring the accuracy of the video object segmentation. The IoU metric is the ratio of the area of overlap (intersection) over the area of union of the ground-truth mask and the estimated mask. The reference-guided mask propagation (RGMP) technique disclosed herein works robustly without any online training or post-processing, leading to high efficiency at inference time. As shown in FIG. 15, the RGMP technique can not only achieve state-of-the-art performance on public benchmark datasets, but also can run orders of magnitude faster than existing methods that rely on online training.

In one example, DAVIS, SegTrack v2, and JumpCut datasets are used for the evaluation. In the example, the DAVIS-2016 validation dataset is used for single object segmentation, the DAVIS-2017 validation dataset and the SegTrack v2 are used for multi-object segmentation, and the JumpCut dataset is used for the video cutout scenario. For the DAVIS datasets, the region similarity J and the contour accuracy $\mathcal{F}$ are measured using the provided benchmark code. For the SegTrack v2 and JumpCut datasets, since videos has various resolutions, the video frames are re-scaled to have 480 pixels on the shorter edge before processing, and the performance is measured according to the evaluation protocols suggested for these datasets.

For the DAVIS-2016 dataset, the RGMP method is compared with existing methods in Table 1. Table 1 includes common features of each method. Most existing methods rely on online training that fine-tunes a network on the first frame of each test video. Post-processing (e.g., dense CRF or boundary snapping) is often employed to refine the output. Some methods are also aided by additional optical flow information. The time column of Table 1 shows the approximated run time (in seconds) per frame. Methods with * represent a variant of the corresponding base method without online training and post-processing. Among the methods without online training, the RGMP method disclosed herein significantly outperforms other methods. Compared with methods with online training, the RGMP technique can achieve comparable accuracy without the online fine-tuning and post-processing. With the differences in implementations and running environments taken into consideration, the RGMP technique has higher efficiency than previous methods due to the efficient inference without online training and post-processing.

TABLE 1

Quantitative evaluation results using the DAVIS-2016 validation dataset

|  | OL | PP | OF | J mean | $\mathcal{F}$ mean | Time (S) |
|---|---|---|---|---|---|---|
| PLM | × | × |  | 70.0 | 62.0 | 0.3 |
| SegFlow | × |  |  | 74.8 | 74.5 | 7.9 |
| MSK | × | × | × | 79.7 | 75.4 | 12 |
| LCT | × | × | × | 80.5 | 77.6 | — |
| MaskRNn | × |  | × | 80.7 | 80.9 | — |
| OSVOS | × | × |  | 79.8 | 80.6 | 9 |
| OSVOS$^S$ | × | × |  | 85.6 | 86.4 | 4.5 |
| OnAVOS | × | × |  | 86.1 | 84.9 | 13 |
| BVs |  |  |  | 60.0 | 58.8 | 0.37 |
| OFL |  |  |  | 68.0 | 63.4 | 120 |
| VPN |  |  |  | 70.2 | 65.5 | 0.63 |
| SegFlow* |  |  |  | 67.4 | 66.7 | — |
| MaskRNN* |  |  | × | 56.3 | — | — |
| OnAVOS* |  |  |  | 72.7 | — | — |
| RGMP |  |  |  | 81.5 | 82.0 | 0.13 |

Table 2 shows example results of multi-object video segmentation on DAVIS-2017 validation dataset using various techniques. The region similarity J and the contour accuracy $\mathcal{F}$ are measured for the multi-object video segmentation. MaskRNN* corresponds to the MaskRNN technique without online training. OnAVOS+ corresponds to a challenge entry obtained from an ensemble model. The results show that the RGMP technique disclosed herein can achieve state-of-the-art performance for multi-object video segmentation.

TABLE 2

Quantitative evaluation results using the DAVIS-2017 validation dataset

|  | J mean | $\mathcal{F}$ mean |
|---|---|---|
| OFL | 43.2 | — |
| OSVOS | 52.1 | — |
| MaskRNN | 60.5 | — |
| MaskRNN* | 45.5 | — |
| OnAVOS | 61.0 | 66.1 |
| OnAVOS+ | 64.5 | 71.1 |
| RGMP | 64.8 | 68.6 |

Table 3 shows example results of multi-object video segmentation on SegTrack v2 validation dataset using various techniques. The RGMP technique uses the same network and parameters as in the DAVIS experiments for object mask estimation. It is noted that, because no online training is performed, the network trained on the DAVIS-2017 training set is completely blind to the SegTrack v2 data. Table 3 shows that the RGMP technique has competitive performance for the SegTrack v2 data over methods that use online training even though the network is trained on the DAVIS-2017 training dataset. Thus, this experiment demonstrates the generalization performance of the RGMP method disclosed herein.

TABLE 3

Quantitative evaluation results using the SegTrack v2 validation dataset

|  | BVS | OFL | MSK | OSVOS | MaskRNN | LCT | RGMP |
|---|---|---|---|---|---|---|---|
| IoU | 58.5 | 67.5 | 70.3 | 65.4 | 72.1 | 77.6 | 71.6 |

Figure 16:
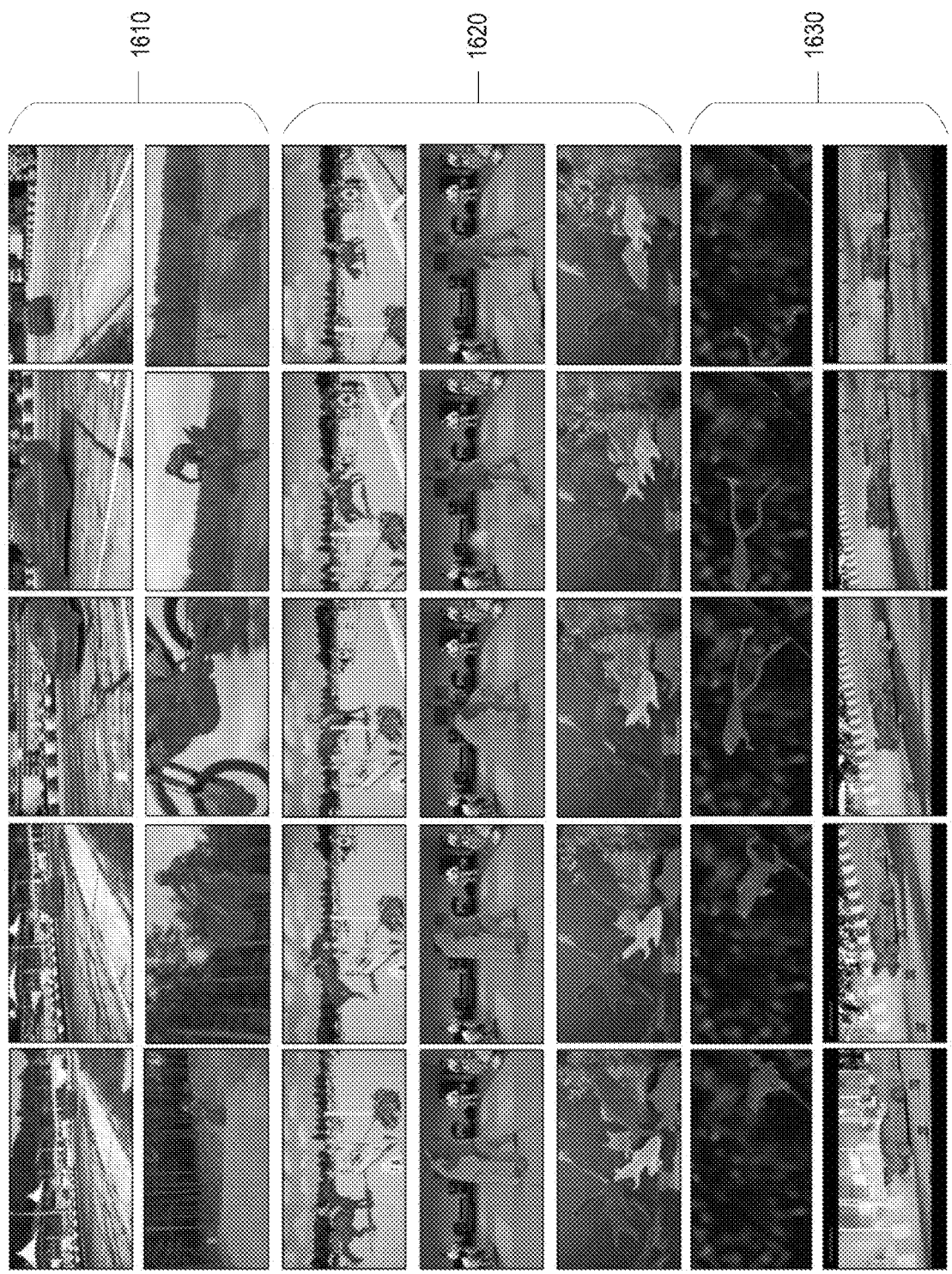
FIG. 16 illustrates example qualitative results of segmenting DAVIS and SegTrack v2 datasets using disclosed techniques according to certain embodiments.

FIG. 16 illustrates example qualitative results of the disclosed method on DAVIS and SegTrack v2 datasets. A first group 1610 includes segmentation results for frames from DAVIS-2016 videos. A second group 1620 includes segmentation results for frames from DAVIS-2017 videos. A third group 1630 includes segmentation results for frames from SegTrack v2 videos. The frames are sampled uniformly. It can be seen from the example qualitative results that the RGMP method works well on various types of objects and motions and is able to handle multiple objects well.

To evaluate the disclosed RGMP method in the video cutout scenario, the network is further tested on the JumpCut dataset. Again, the network is totally blind to the JumpCut dataset as the network is pre-trained on the DAVIS training dataset without any modification. In the experiment, multiple key frames (e.g., 0, 16, 32, . . . , 96) from a video stream are sampled and propagated for a transfer distance d (frames). Errors of the estimated area compared with the actual object area are measured at the end of each propagation. As shown in Table 4, the RGMP method has the lowest errors with the transfer distance of 8 frames, 16 frames, or 32 frames. Thus, the RGMP method significantly outperforms all existing methods on JumpCut dataset.

TABLE 4

Performance of various methods on JumpCut

| Error | RB | DA | SS | JC | PLM | RGMP |
|---|---|---|---|---|---|---|
| d = 8 | 20.0 | 14.8 | 15.7 | 7.21 | — | 4.89 |
| d = 16 | 28.7 | 23.7 | 18.9 | 9.82 | 9.55 | 6.91 |
| d = 32 | 39.9 | 34.9 | 27.0 | 16.2 | — | 10.3 |

Extensive ablation study has also been performed to determine the effects of various features of the disclosed method. As described above, the method according to certain embodiments takes two sets of images and masks, one for the reference path of the encoder network and the other for the target path of the encoder network. The importance of each path of the network may be investigated. For example, when the access to the reference input is blocked, the network would propagate the previous mask to the current frame without reference information. Thus, to evaluate the effect of the reference input, the reference input may be set to zero without modifying the network structure. This setup is referred to as the "−Ref" model. If the previous mask is not fed to the network, the network can detect the target object using the reference frame without any temporal prior. Thus, to evaluate the effect of the previous mask, the previous mask input can be set to zero. This setup is referred to as the "−Prev" model.

Table 5 shows example results for different network input configurations in an ablation study. The "−Ref" model and the "−Prev" model used in the ablation study and referred to in Table 5 are independently trained using the two-stage training techniques described above, where the network is first trained on simulated samples using static image datasets and then fine-tuned using a video segmentation dataset. As shown in Table 5, both ablation setups ("−Ref" model and "−Prev" model) show significant performance degradation. The low score of the "−Ref" model shows that simply refining the previous segmentation mask according to the current video frame is not sufficient to get good results because it is prone to drifting and cannot handle occlusions. Techniques, such as online training and optical flow, may need to be used to handle the occlusions scenarios and overcome the drifting issues. For the "−Prev" model, while the setup is similar to some detection-based methods, the "−Prev" model can perform better than the detection-based methods (e.g., about +3.5 in terms of the J mean), which may be caused by the pre-training. Nonetheless, the "−Prev" model may still suffer from the structural limitation as it mainly depends on the appearance of the target object in the reference frame, and thus may have difficulty handling changes in object appearance or multiple objects with similar appearances. In some implementations, the limitation may be resolved through online adaptation, which updates the model at every time step.

TABLE 5

Results of ablation study

|  | RGMP | -Ref | -Prev | -PT | -FT | -Rec |
|---|---|---|---|---|---|---|
| $J$ Mean | 81.5 | 68.3 | 73.5 | 68.6 | 55.0 | 74.3 |
| $\mathcal{F}$ Mean | 82.0 | 68.2 | 74.2 | 68.9 | 59.1 | 74.8 |
| Δ | — | −13.5 | −7.9 | −13.0 | −24.7 | −7.2 |

Figure 17:
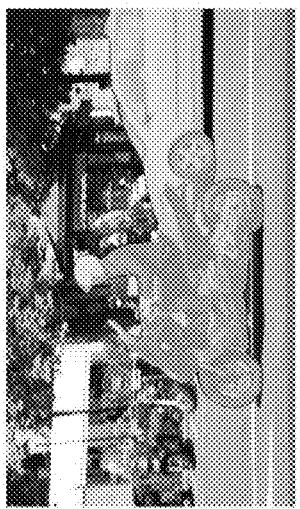
FIG. 17 are example results illustrating the effects of different network input configurations on a same video stream according to certain embodiments.
Figure 17:
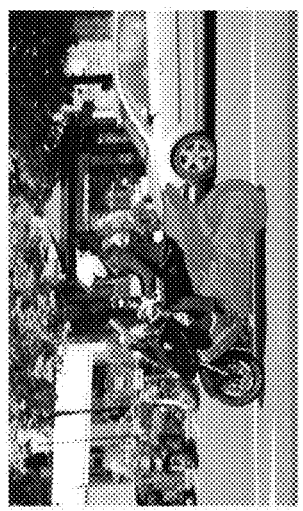
Figure 17:
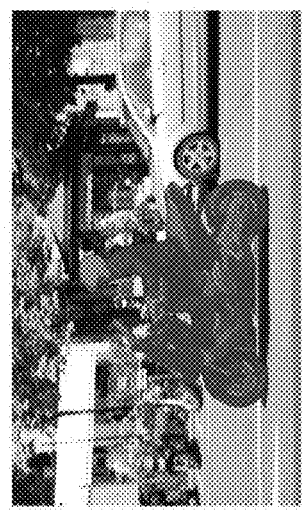
Figure 17:
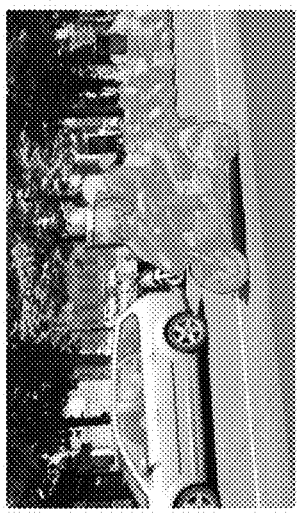
Figure 17:
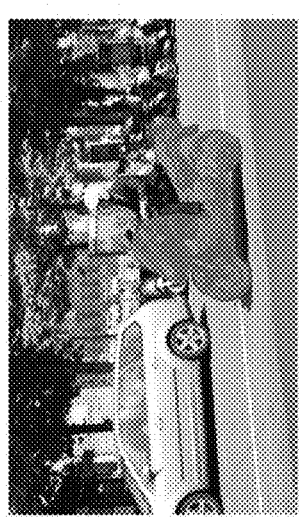
Figure 17:
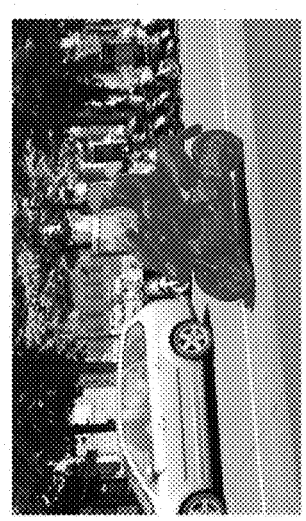
Figure 17:
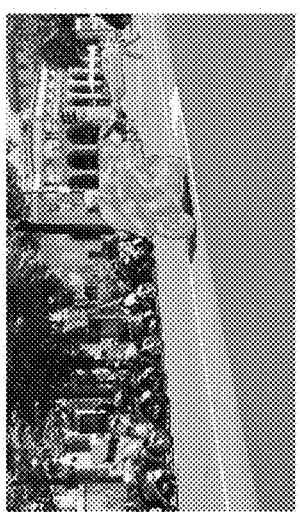
Figure 17:
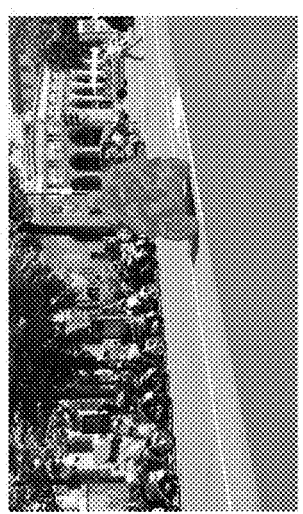
Figure 17:
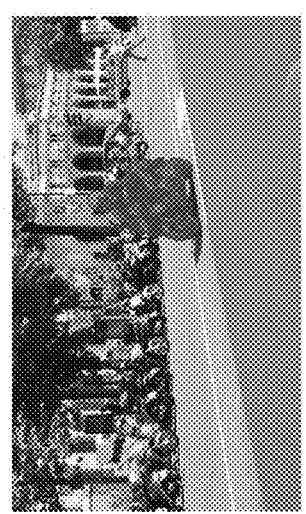

FIG. 17 are example results illustrating the effects of different network input configurations on a same video stream according to certain embodiments. The first group 1710 of video frames shows the results using the "−Ref" model where the reference input is not used. The second group 1720 of video frames shows the results using the "−Prev" model where the previous mask is not used. The third group 1730 of video frames shows the results using the full RGMP model disclosed herein. As shown in FIG. 17, the "−Ref" model may cause the mask to drift to the background textures, and the "−Prev" model may fail to adapt to the appearance changes over time, while the complete RGMP model shows stable results.

Table 5 also includes the results of an ablation study for the training process. As described above, according to certain embodiments, the network is trained through pre-training on simulated static image training samples and fine-tuning on video training samples. The effect of each training stage is studied and the results are shown in Table 5. For example, the pre-training stage is skipped in the "−PT" model, and the fine-tuning stage is skipped in the "−FT" model. In addition, to highlight the effect of the recurrence when training using video data, the "−Rec" model is trained with both the pre-training stage and the fine-tuning stage but without the recurrence during the fine-tuning. As shown in Table 5, both training stages affect the segmentation results, and training with recurrence further improves the performance of the network.

Further study has been conducted to investigate how additional techniques may further improve the performance of the RGMP technique. The additional techniques studied include, for example, online training, refinement with conditional random field (CRF), visual memory, etc. Table 6 summarizes the study results on the DAVIS-2016 validation set.

TABLE 6

Results of add-on study on DAVIS-2016 validation dataset

|  | RGMP | +OL | +CRF | +GRU |
|---|---|---|---|---|
| J Mean | 81.5 | 82.4 | 81.9 | 79.6 |
| F Mean | 82.0 | 82.2 | 79.9 | 81.0 |
| Time (s) | 0.13 | +1.74 | +2.53 | +0.01 |

In one experiment, the RGMP network is fine-tuned using the reference frame of a test video to adapt the model to the appearance of the target object. To train the network using a single frame, a synthesis strategy as described above is used to automatically generate both the reference frame and the target frame from a single reference image by applying different random transformations. This technique is referred to as the "+OL" technique. In one example online fine-tuning, an ADAM optimizer is used, and the learning rate is set to 1e-7 and the number of iteration is 1000. As shown in Table 6, the additional online fine-tuning provides a slight improvement (e.g., J mean value from 81.5 to 82.4) over an RGMP network that does not use online training, but significantly increases the processing time. This result shows that the RGMP network may have inherently learned the appearance of the target object from the reference frame and the ground-truth mask. Thus, the RGMP method may achieve comparable results without online training, while avoiding the computational overhead of online training.

In another experiment, a dense CRF technique is applied in the post-processing to refine the outputs. This technique is referred to as the "+CRF" technique. The hyperparameters of the dense CRF are determined using a grid search on the validation set. As shown in Table 6, the CRF technique affects the J mean and $\mathcal{F}$ mean differently. For example, it improves the J mean (e.g., by 0.4), but degrades the $\mathcal{F}$ mean (e.g., by –2.1). The CRF technique helps to refine mask boundaries to better align with the object and increases the overall overlapping area (and thus the J mean), but sometimes smooths out fine details and thus decreases the F mean. The RGMP network disclosed herein, in particular, the refinement module (e.g., refinement modules 752-756) used in the decoder, is able to recover fine details without additional post-processing as indicated by the J means results.

Figure 18C:
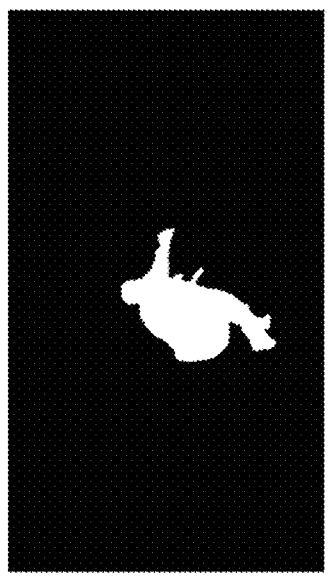
FIGS. 18A-18C illustrates the effect of conditional random field (CRF) refinement according to certain embodiments.
Figure 18B:
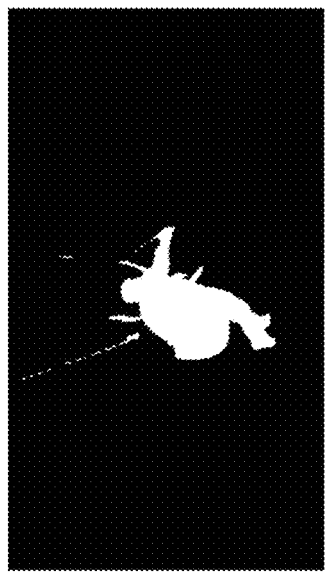
Figure 18A:

FIGS. 18A-18C illustrates the effect of CRF refinement according to certain embodiments. FIG. 18A illustrates a video frame. FIG. 18B illustrates the estimated mask before the CRF refinement. FIG. 18C illustrates the estimated mask after the CRF refinement. As shown by FIGS. 18B and 18C, after the CRF refinement, some details, such as the parachute strings, may be lost.

In another experiment, the RGMP network is augmented with visual memory. While the training scheme disclosed with respect to certain embodiments (e.g., as shown in FIG. 11) already uses recurrence, it may be helpful to have an extra memory module that could directly connect internal features at different time steps. In some implementations, a visual memory is added to the RGMP network by implanting an RNN cell to the output of the global convolution block (e.g., global convolution block 740). In one specific implementation, the feature from a previous time step is combined with the current one using a 3×3 convolutional gated recurrent unit (GRU). The GRU is inserted after the pre-training stage (that uses synthetic static image training samples) because training the RNN generally requires sequential data. The GRU weights are randomly initialized and trained after fixing the weights of other network filters. In one example, a recursive learning scheme is used and the number of recursions is increased by 1 for every 3000 iterations until the number of recursions reaches 5. After the GRU training, all weights are fine-tuned together. The results in Table 6 show that no improvement is made with an additional GRU unit. This may be caused by over-fitting (thus the training loss may be much lower) and limited video training data for training RNNs (e.g., about 60 sequences in total).

Figure 19:
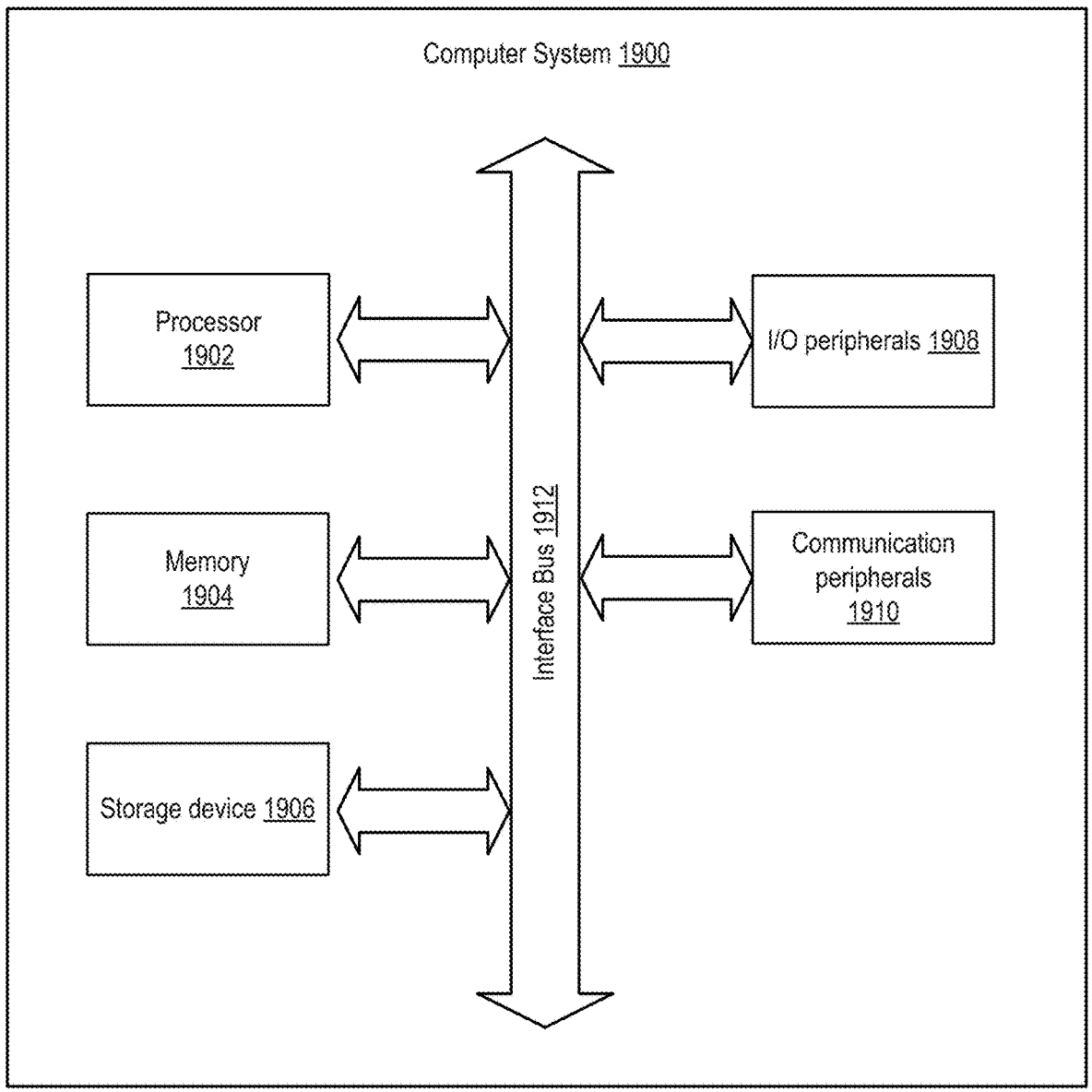
FIG. 19 illustrates an example computer system for implementing some of the embodiments disclosed herein.

FIG. 19 illustrates an example computer system 1900 for implementing some of the embodiments disclosed herein. Computer system 1900 may have a distributed architecture, where some of the components (e.g., memory and processor) are part of an end user device and some other similar components (e.g., memory and processor) are part of a computer server. Computer system 1900 includes at least a processor 1902, a memory 1904, a storage device 1906, input/output (I/O) peripherals 1908, communication peripherals 1910, and an interface bus 1912. Interface bus 1912 is configured to communicate, transmit, and transfer data, controls, and commands among the various components of computer system 1900. Memory 1904 and storage device 1906 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 1904 and storage device 1906 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1900.

Further, memory 1904 includes an operating system, programs, and applications. Processor 1902 is configured to execute the stored instructions and includes, for example, a logical processing unit, a microprocessor, a digital signal processor, and other processors. Memory 1904 and/or processor 1902 can be virtualized and can be hosted within another computing systems of, for example, a cloud network or a data center. I/O peripherals 1908 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 1908 are connected to processor 1902 through any of the ports coupled to interface bus 1912. Communication peripherals 1910 are configured to facilitate communication between computer system 1900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
    obtaining an image and a corresponding object mask identifying an object in the image;
    synthesizing, using the image and the corresponding object mask, a first training image and a corresponding first training object mask, and a second training image and a corresponding second training object mask, the synthesizing comprising applying transformations on the image and the corresponding object mask;
    pre-training a neural network using the first and the second training images and the corresponding first and second training object masks by encoding the first training image and the corresponding first training object mask into a first training feature map and encoding the second training image and the corresponding second training object mask into a second training feature map; and
    fine-tuning the neural network using a video training dataset.

2. The computer-implemented method of claim 1, wherein:
    synthesizing the first training image and the corresponding first training object mask comprises applying a first set of transformations on the image and the corresponding object mask;
    synthesizing the second training image comprises applying a second set of transformations on the image;
    synthesizing the second training object mask comprises applying the second set of transformations on the object mask to generate a transformed object mask and applying an affine transform on the transformed object mask; and
    the first set of transformations is different from the second set of transformations.

3. The computer-implemented method of claim 2, wherein the first set of transformations and the second set of transformations comprise one or more of rotation, scaling, or color perturbation.

4. The computer-implemented method of claim 1, wherein:
- synthesizing the first training image comprises applying a first set of transformations on the object in the image to generate a first transformed object and blending the first transformed object with a background image;
- synthesizing the first training object mask comprises applying the first set of transformations on the object mask;
- synthesizing the second training image comprises applying a second set of transformations on the object in the image to generate a second transformed object and blending the second transformed object with the background image;
- synthesizing the second training object mask comprises applying the second set of transformations on the object mask to generate a transformed object mask and applying an affine transform on the transformed object mask; and
- the first set of transformations is different from the second set of transformations.

5. The computer-implemented method of claim 1, wherein fine-tuning the neural network comprises:
- encoding a reference training frame in the video training dataset and a corresponding reference training mask into a reference feature map;
- obtaining a first training segmentation mask for a first training frame in the video training dataset;
- encoding a second training frame in the video training dataset and the first training segmentation mask into a training feature map, wherein the second training frame is a next frame after the first training frame in the video training dataset; and
- extracting a second training segmentation mask for the second training frame based on the reference feature map and the training feature map.

6. The computer-implemented method of claim 1, wherein fine-tuning the neural network comprises:
- encoding a reference training frame in the video training dataset and a corresponding reference training mask into a reference feature map;
- extracting a first training segmentation mask for a first training frame in the video training dataset based on the reference feature map and another feature map encoded based on the first training frame;
- encoding a second training frame in the video training dataset and the first training segmentation mask into a training feature map, wherein the second training frame is a next frame after the first training frame in the video training dataset; and
- extracting a second training segmentation mask for the second training frame based on the reference feature map and the training feature map.

7. The computer-implemented method of claim 1, further comprising segmenting a target object from a video stream based on a target segmentation mask generated from the video stream using the neural network.

8. A system comprising:
- a processor; and
- a non-transitory computer-readable medium communicatively coupled to the processor, wherein the processor is configured to execute program code stored in the non-transitory computer-readable medium and thereby perform operations comprising:
  - obtaining an image and a corresponding object mask identifying an object in the image;
  - synthesizing, using the image and the corresponding object mask, a first training image and a corresponding first training object mask, and a second training image and a corresponding second training object mask, the synthesizing comprising applying transformations on the image and the corresponding object mask;
  - pre-training a neural network using the first and the second training images and the corresponding first and second training object masks by encoding the first training image and the corresponding first training object mask into a first training feature map and encoding the second training image and the corresponding second training object mask into a second training feature map; and
  - fine-tuning the neural network using a video training dataset.

9. The system of claim 8, wherein:
- synthesizing the first training image and the corresponding first training object mask comprises applying a first set of transformations on the image and the corresponding object mask;
- synthesizing the second training image comprises applying a second set of transformations on the image;
- synthesizing the second training object mask comprises applying the second set of transformations on the object mask to generate a transformed object mask and applying an affine transform on the transformed object mask; and
- the first set of transformations is different from the second set of transformations.

10. The system of claim 9, wherein the first set of transformations and the second set of transformations comprise one or more of rotation, scaling, or color perturbation.

11. The system of claim 8, wherein:
- synthesizing the first training image comprises applying a first set of transformations on the object in the image to generate a first transformed object and blending the first transformed object with a background image;
- synthesizing the first training object mask comprises applying the first set of transformations on the object mask;
- synthesizing the second training image comprises applying a second set of transformations on the object in the image to generate a second transformed object and blending the second transformed object with the background image;
- synthesizing the second training object mask comprises applying the second set of transformations on the object mask to generate a transformed object mask and applying an affine transform on the transformed object mask; and
- the first set of transformations is different from the second set of transformations.

12. The system of claim 8, wherein fine-tuning the neural network comprises:
- encoding a reference training frame in the video training dataset and a corresponding reference training mask into a reference feature map;
- obtaining a first training segmentation mask for a first training frame in the video training dataset;
- encoding a second training frame in the video training dataset and the first training segmentation mask into a training feature map, wherein the second training frame is a next frame after the first training frame in the video training dataset; and extracting a second training segmentation mask for the second training frame based on the reference feature map and the training feature map.

13. The system of claim 12, wherein obtaining a first training segmentation mask for a first training frame in the video training dataset comprises:

extracting the first training segmentation mask for the first training frame in the video training dataset based on the reference feature map and another feature map encoded based on the first training frame.

14. The system of claim 8, wherein the operations further comprise segmenting a target object from a video stream based on a target segmentation mask generated from the video stream using the neural network.

15. A non-transitory computer-readable medium having program code that is stored thereon, the program code executable by one or more processing devices for performing operations comprising:

obtaining an image and a corresponding object mask identifying an object in the image;

synthesizing, using the image and the corresponding object mask, a first training image and a corresponding first training object mask, and a second training image and a corresponding second training object mask, the synthesizing comprising applying transformations on the image and the corresponding object mask;

pre-training a neural network using the first and the second training images and the corresponding first and second training object masks by encoding the first training image and the corresponding first training object mask into a first training feature map and encoding the second training image and the corresponding second training object mask into a second training feature map; and fine-tuning the neural network using a video training dataset.

16. The non-transitory computer-readable medium of claim 15, wherein:

synthesizing the first training image and the corresponding first training object mask comprises applying a first set of transformations on the image and the corresponding object mask;

synthesizing the second training image comprises applying a second set of transformations on the image;

synthesizing the second training object mask comprises applying the second set of transformations on the object mask to generate a transformed object mask and applying an affine transform on the transformed object mask; and the first set of transformations is different from the second set of transformations.

17. The non-transitory computer-readable medium of claim 16, wherein the first set of transformations and the second set of transformations comprise one or more of rotation, scaling, or color perturbation.

18. The non-transitory computer-readable medium of claim 15, wherein:

synthesizing the first training image comprises applying a first set of transformations on the object in the image to generate a first transformed object and blending the first transformed object with a background image;

synthesizing the first training object mask comprises applying the first set of transformations on the object mask;

synthesizing the second training image comprises applying a second set of transformations on the object in the image to generate a second transformed object and blending the second transformed object with the background image;

synthesizing the second training object mask comprises applying the second set of transformations on the object mask to generate a transformed object mask and applying an affine transform on the transformed object mask; and the first set of transformations is different from the second set of transformations.

19. The non-transitory computer-readable medium of claim 15, wherein fine-tuning the neural network comprises:

encoding a reference training frame in the video training dataset and a corresponding reference training mask into a reference feature map;

obtaining a first training segmentation mask for a first training frame in the video training dataset;

encoding a second training frame in the video training dataset and the first training segmentation mask into a training feature map, wherein the second training frame is a next frame after the first training frame in the video training dataset; and extracting a second training segmentation mask for the second training frame based on the reference feature map and the training feature map.

20. The non-transitory computer-readable medium of claim 15, wherein the operations further comprise segmenting a target object from a video stream based on a target segmentation mask generated from the video stream using the neural network.

* * * * *